United States Patent
Li et al.

(10) Patent No.: US 11,943,711 B2
(45) Date of Patent: Mar. 26, 2024

(54) INFORMATION SENDING AND RECEIVING METHOD AND COMMUNICATIONS DEVICE FOR REDUCING ENERGY CONSUMPTION OF A TERMINAL DEVICE

(71) Applicant: HUAWEI TECHNOLOGIES CO., LTD., Guangdong (CN)

(72) Inventors: Xiaocui Li, Beijing (CN); Yifan Xue, Beijing (CN); Yu Cai, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 484 days.

(21) Appl. No.: 17/269,667

(22) PCT Filed: Aug. 19, 2019

(86) PCT No.: PCT/CN2019/101390
§ 371 (c)(1),
(2) Date: Feb. 19, 2021

(87) PCT Pub. No.: WO2020/038334
PCT Pub. Date: Feb. 27, 2020

(65) Prior Publication Data
US 2021/0368438 A1 Nov. 25, 2021

(30) Foreign Application Priority Data
Aug. 20, 2018 (CN) .......................... 201810950097.0

(51) Int. Cl.
*H04W 52/02* (2009.01)
*H04L 5/00* (2006.01)

(52) U.S. Cl.
CPC ....... *H04W 52/0225* (2013.01); *H04L 5/0053* (2013.01)

(58) Field of Classification Search
CPC .......................... H04W 52/0225; H04L 5/0053
(Continued)

(56) References Cited

U.S. PATENT DOCUMENTS

2007/0230393 A1* 10/2007 Sinha .................... H04W 12/50
370/328
2010/0271998 A1* 10/2010 Jin ..................... H04W 52/0216
370/329
(Continued)

FOREIGN PATENT DOCUMENTS

| CN | 103533606 A | 1/2014 |
| CN | 107896389 A | 4/2018 |

(Continued)

OTHER PUBLICATIONS

3GPP Organizational Partners, 3GPP TS 38.212 V15.2.0 (Jun. 2018), 3rd Generation Partnership Project; Technical Specification Group Radio Access Network; NR; Multiplexing and channel coding, Jun. 2018 (Year: 2018).*

(Continued)

*Primary Examiner* — Mark G. Pannell

(57) ABSTRACT

Embodiments of this application provide an information sending and receiving method and a communications device. The method includes: A network device configures first information. The first information includes a first field and/or a second field, the first field includes information indicating an energy saving state of a terminal device, and the second field includes information indicating a time length in which the terminal device maintains the energy saving state. Then, the network device sends the first information to the terminal device. In addition, the method includes: The terminal device receives the first information sent by the network device. Then, the terminal device reads the first field and/or the second field, and adjusts the energy saving state of the terminal device based on information obtained through reading. The technical solution provided in the embodiments of this application can reduce energy consumption of the terminal device to some extent.

18 Claims, 9 Drawing Sheets

(58) Field of Classification Search
USPC .......................................................... 370/311
See application file for complete search history.

(56) References Cited

U.S. PATENT DOCUMENTS

| | | | | |
|---|---|---|---|---|
| 2011/0317602 | A1* | 12/2011 | Gupta | H04W 74/0833 370/311 |
| 2015/0351153 | A1* | 12/2015 | Ramkumar | H04W 74/004 370/329 |
| 2016/0014695 | A1* | 1/2016 | Ehsan | H04L 5/14 370/311 |
| 2018/0107263 | A1* | 4/2018 | Touboul | G06F 1/3209 |
| 2019/0254110 | A1* | 8/2019 | He | H04L 5/0048 |
| 2019/0363843 | A1* | 11/2019 | Gordaychik | H04L 1/08 |
| 2020/0029302 | A1* | 1/2020 | Cox | H04W 68/02 |
| 2020/0045707 | A1* | 2/2020 | Hwang | H04W 72/23 |
| 2021/0329557 | A1* | 10/2021 | Zhou | H04W 52/0235 |

FOREIGN PATENT DOCUMENTS

| | | |
|---|---|---|
| CN | 108024362 A | 5/2018 |
| EP | 2941062 A1 | 11/2015 |
| WO | 2018066923 A1 | 4/2018 |
| WO | 2018085024 A1 | 5/2018 |

OTHER PUBLICATIONS

Apple Inc., "Control Information for UE Power Saving", 3GPP TSG-RAN WG1 Meeting #90-Bis, Prague, Czech, Oct. 9-13, 2017, R1-1717781, total 6 pages.

Apple Inc. et al., "BWP of Size Zero for UE Power Saving", 3GPP TSG-RAN WG1 #91 Reno, US, Nov. 27-Dec. 1, 2017, R1-1720546, total 6 pages.

Huawei et al., "Power saving signal or channel in NB-Iot", 3GPP TSG-RAN WG2 Meeting #99, Berlin, Germany, Aug. 21-25, 2017, R2-1708301, total 4 pages.

LG Electronics, "Discussion on power saving signal/channel in MTC", 3GPP TSG RAN WG1 Meeting 90bis, Prague, CZ, Oct. 9-13, 2017, R1-1717279, total 12 pages.

3GPP TS 38.213 V15.2.0 (Jun. 2018), 3rd Generation Partnership Project; Technical Specification Group Radio Access Network; NR;P hysical layer procedures for control (Release 15), total 99 pages.

3GPP TS 38.211 V15.2.0 (Jun. 2018), 3rd Generation Partnership Project; Technical Specification Group Radio Access Network; NR; Physical channels and modulation (Release 15), total 96 pages.

International Search Report and Written Opinion issued in PCT/CN2019/101390, dated Oct. 28, 2019, total 9 pages.

Extended European Search Report issued in EP 19850922.6, dated Jul. 29, 2021, total 13 pages.

Office Action issued in CN 201810950097.0, dated Mar. 3, 2021, total 7 pages.

Office Action issued in CN 201810950097.0, dated Aug. 18, 2021, total 5 pages.

* cited by examiner

INFORMATION SENDING AND RECEIVING METHOD AND COMMUNICATIONS DEVICE FOR REDUCING ENERGY CONSUMPTION OF A TERMINAL DEVICE

CROSS-REFERENCE TO RELATED APPLICATION(S)

This application is a National Stage of International Application No. PCT/CN2019/101390, filed on Aug. 19, 2019, which claims priority to Chinese Patent Application No. 201810950097.0, filed on Aug. 20, 2018, each of which are hereby incorporated by reference in their entireties.

TECHNICAL FIELD

This application relates to the field of communications technologies, and especially, to an information sending and receiving method and a communications device.

BACKGROUND

A fifth-generation (5G) new radio (NR) technology provides high-speed and convenient mobile network services for many users.

In the prior art, a base station sends downlink control information (DCI) to a terminal device, to indicate a specific time-frequency resource location and a specific configuration parameter used by the terminal device to receive and demodulate downlink data. Therefore, to receive the DCI, the terminal device needs to continually perform blind detection (BD) at a plurality of physical downlink control channel (PDCCH) candidate locations, to determine whether there is DCI sent to the terminal device, so that the terminal device can further receive and demodulate the downlink data based on the received DCI.

The terminal device continually performs blind PDCCH detection, and consequently relatively high energy consumption of the terminal device is caused. How to reduce energy consumption of the terminal device becomes a hot research topic to be discussed urgently in the art.

SUMMARY

This application provides an information sending and receiving method and a communications device, to reduce energy consumption of a terminal device.

According to a first aspect, this application provides an information sending method. The method includes: configuring, by a network device, first information; and sending the first information to a terminal device, where the first information includes a first field and/or a second field, the first field includes information indicating an energy saving state of the terminal device, and the second field includes information indicating a time length in which the terminal device maintains the energy saving state. According to the solution provided in this embodiment, the terminal device can adjust a working state of the terminal device based on the received first information, to reduce energy consumption of the terminal device as much as possible when the network device does not send data to the terminal device.

With reference to the first embodiment of the first aspect, in a second embodiment, all or some bits of the first field are used to indicate the energy saving state information of the terminal device.

With reference to the first embodiment or the second embodiment of the first aspect, in a third embodiment, all or some values of the first field are used to indicate the energy saving state information of the terminal device.

With reference to any one of the first embodiment to the third embodiment of the first aspect, in a fourth embodiment, the first field is a newly added field or an original field in the first information. According to the solution provided in this embodiment, the first information may be configured in a manner of creating a new information format, adding a field to existing information, or reusing an original field. This is relatively flexible.

With reference to any one of the first embodiment to the fourth embodiment of the first aspect, in a fifth embodiment, when the first field is an original field in the first information, the first field is a frequency domain resource allocation field in the first information.

With reference to any one of the first embodiment to the fourth embodiment of the first aspect, in a sixth embodiment, when the first field is a newly added field in the first information, the first information is in a downlink control information format DCI format 2-2. The DCI format 2-2 is group common DCI, and has relatively high deformability. According to the solution provided in this embodiment, an original function of existing DCI is not limited, and the energy saving state of the terminal device can be indicated only by using a newly added field.

With reference to any one of the first embodiment to the sixth embodiment of the first aspect, in a seventh embodiment, the energy saving state information includes: information that indicates the terminal device to go to sleep; or information that indicates the terminal device to wake up.

With reference to any one of the first embodiment to the seventh embodiment of the first aspect, in an eighth embodiment, all or some bits of the second field are used to indicate the information about the time length in which the terminal device maintains the energy saving state.

With reference to any one of the first embodiment to the eighth embodiment of the first aspect, in a ninth embodiment, all or some values of the second field are used to indicate the information about the time length in which the terminal device maintains the energy saving state.

With reference to any one of the first embodiment to the ninth embodiment of the first aspect, in a tenth embodiment, the second field is a newly added field or an original field in the first information.

With reference to any one of the first embodiment to the tenth embodiment of the first aspect, in an eleventh embodiment, when the second field is an original field in the first information, the second field is a frequency domain resource allocation field in the first information.

With reference to any one of the first embodiment to the eleventh embodiment of the first aspect, in a twelfth embodiment, when the second field is a newly added field in the first information, the first information is in the downlink control information format 2-2. The DCI format 2-2 is group common DCI, and has relatively high deformability. According to the solution provided in this embodiment, an original function of existing DCI is not limited, and the energy saving state of the terminal device can be indicated only by using a newly added field.

With reference to any one of the first embodiment to the twelfth embodiment of the first aspect, in a thirteenth embodiment, the time length information is: one or more slots; or one or more subframes; or one or more pieces of on duration on duration; or one or more physical downlink control channel monitoring occasions PDCCH monitoring occasion.

With reference to any one of the first embodiment to the thirteenth embodiment of the first aspect, in a fourteenth embodiment, the first information further includes at least one of the following fields: a bandwidth part indicator field, a sounding reference signal (SRS) request field, a transmit power control (TPC) command for a preset physical uplink shared channel (TPC command for scheduled PUSCH) field, and an antenna port(s) field.

With reference to any one of the first embodiment to the fourteenth embodiment of the first aspect, in a fifteenth embodiment, the method further includes: receiving, by the network device, offset duration offset information sent by the terminal device, where the offset information indicates information about a time length between a receiving moment at which the terminal device receives the first information and a preset moment, and the preset moment is the first slot or the first subframe in which the terminal device enters on duration in a discontinuous reception state. According to a possible solution provided in this embodiment, after receiving the offset information, the network device can use the offset information as a reference when determining the first information, so that the first information sent by the network device to the terminal device can meet a requirement on duration in which the terminal device demodulates the first information.

With reference to any one of the first embodiment to the fifteenth embodiment of the first aspect, in a sixteenth embodiment, the method further includes: receiving, by the network device, capability information sent by the terminal device, where the capability information is used to indicate whether the terminal device has an energy saving working mode. According to the solution provided in this embodiment, the first information may be sent to only a terminal device that has an energy saving working mode. This can reduce a data configuration amount and a data sending amount of the network device, and can avoid an energy consumption loss caused when a terminal device that does not have an energy saving working mode receives invalid first data.

With reference to any one of the first embodiment to the sixteenth embodiment of the first aspect, in a seventeenth embodiment, the network device sends second information to the terminal device, where the second information is used to indicate whether the terminal device switches to the energy saving working mode. According to the solution provided in this embodiment, the terminal device can be indicated to enter the energy saving working mode, so as to change a working mode of the terminal device by using the first information, thereby reducing energy consumption.

With reference to the seventeenth embodiment of the first aspect, in an eighteenth embodiment, the second information is at least one of a radio resource control (RRC) message, a media access control control element (MAC CE) message, and downlink control information (DCI). In other words, the network device may send the second information in any one or more of the foregoing manners. This is relatively flexible.

With reference to any one of the first embodiment to the eighteenth embodiment of the first aspect, in a nineteenth embodiment, the network device sends third information to the terminal device, where the third information is used to indicate that the terminal device is in a sleep state or a wake-up state. According to the solution provided in this embodiment, when the first information includes only the second field, the currently sent third information may be used to notify the terminal device, so that the terminal device determines a target state of the terminal device.

With reference to the nineteenth embodiment of the first aspect, in a twentieth embodiment, the third information is at least one of a radio resource control (RRC) message, a media access control control element (MAC CE) message, and downlink control information (DCI). In other words, the network device may send the third information in any one or more of the foregoing manners. This is relatively flexible.

With reference to any one of the first embodiment to the twentieth embodiment of the first aspect, in a twenty-first embodiment, the first information is downlink control information (DCI).

According to a second aspect, this application provides an information receiving method. The method includes: receiving, by a terminal device, first information sent by a network device, where the first information includes a first field and/or a second field, the first field includes information indicating an energy saving state of the terminal device, and the second field includes information indicating a time length in which the terminal device maintains the energy saving state; obtaining, by the terminal device, at least one of the energy saving state information and the time length information based on the first information; and adjusting the energy saving state of the terminal device based on the at least one of the energy saving state information and the time length information. According to the solution provided in this embodiment, the terminal device may determine, based on the first information, at least one of the energy saving state and the duration in which the energy saving state is maintained. This reflects whether the network device sends data to the terminal device in the energy saving state and/or within the duration. Therefore, the terminal device only needs to adjust a working state of the terminal device based on the indication of the first information. This can avoid unnecessary energy consumption caused by blind PDCCH detection performed by the terminal device when the network device does not send data to the terminal device, and reduce energy consumption of the terminal device to some extent.

With reference to the first embodiment of the second aspect, in a second embodiment, all or some bits of the first field are used to indicate the energy saving state information of the terminal device.

With reference to the first embodiment or the second embodiment of the second aspect, in a third embodiment, all or some values of the first field are used to indicate the energy saving state information of the terminal device.

With reference to any one of the first embodiment to the third embodiment of the second aspect, in a fourth embodiment, the first field is a newly added field or an original field in the first information. According to the solution provided in this embodiment, the first information may be configured in a manner of creating a new information format, adding a field to existing information, or reusing an original field. This is relatively flexible.

With reference to any one of the first embodiment to the fourth embodiment of the second aspect, in a fifth embodiment, when the first field is an original field in the first information, the first field is a frequency domain resource allocation field in the first information.

With reference to any one of the first embodiment to the fourth embodiment of the second aspect, in a sixth embodiment, when the first field is a newly added field in the first information, the first information is in a downlink control information format 2-2. The DCI format 2-2 is group common DCI, and has relatively high deformability. According to the solution provided in this embodiment, an original function of existing DCI is not limited, and the energy saving state of the terminal device can be indicated only by using a newly added field.

With reference to any one of the first embodiment to the sixth embodiment of the second aspect, in a seventh embodiment, the energy saving state information includes: information that indicates the terminal device to go to sleep; or information that indicates the terminal device to wake up.

With reference to any one of the first embodiment to the seventh embodiment of the second aspect, in an eighth embodiment, all or some bits of the second field are used to indicate the information about the time length in which the terminal device maintains the energy saving state.

With reference to any one of the first embodiment to the eighth embodiment of the second aspect, in a ninth embodiment, all or some values of the second field are used to indicate the information about the time length in which the terminal device maintains the energy saving state.

With reference to any one of the first embodiment to the ninth embodiment of the second aspect, in a tenth embodiment, the second field is a newly added field or an original field in the first information.

With reference to any one of the first embodiment to the tenth embodiment of the second aspect, in an eleventh embodiment, when the second field is an original field in the first information, the second field is a frequency domain resource allocation field in the first information.

With reference to any one of the first embodiment to the tenth embodiment of the second aspect, in a twelfth embodiment, when the second field is a newly added field in the first information, the first information is in the downlink control information format 2-2. The DCI format 2-2 is group common DCI, and has relatively high deformability. According to the solution provided in this embodiment, an original function of existing DCI is not limited, and the energy saving state of the terminal device can be indicated only by using a newly added field.

With reference to any one of the first embodiment to the twelfth embodiment of the second aspect, in a thirteenth embodiment, the time length information is: one or more slots; or one or more subframes; or one or more pieces of on duration on duration; or one or more physical downlink control channel monitoring occasions (PDCCH monitoring occasion).

With reference to any one of the first embodiment to the thirteenth embodiment of the second aspect, in a fourteenth embodiment, the first information further includes at least one of the following fields: a bandwidth part indicator field, a sounding reference signal (SRS) request field, a transmit power control (TPC) command for a preset physical uplink shared channel (TPC command for scheduled PUSCH) field, and an antenna port(s) field.

With reference to any one of the first embodiment to the fourteenth embodiment of the second aspect, in a fifteenth embodiment, the method further includes: sending, by the terminal device, offset duration offset information to the network device, where the offset information indicates information about a time length between a receiving moment at which the terminal device receives the first information and a preset moment, and the preset moment is the first slot or the first subframe in which the terminal device enters on duration in a discontinuous reception state. According to a possible solution provided in this embodiment, after receiving the offset information, the network device can use the offset information as a reference when determining the first information, so that the first information sent by the network device to the terminal device can meet a requirement on duration in which the terminal device demodulates the first information.

With reference to any one of the first embodiment to the fifteenth embodiment of the second aspect, in a sixteenth embodiment, the method further includes: sending, by the terminal device, capability information to the network device, where the capability information is used to indicate whether the terminal device has an energy saving working mode. According to the solution provided in this embodiment, the terminal device may report, to the network device, the capability information indicating whether the terminal device has the energy saving working mode, so that the network device can determine a configuration amount and a sending amount of the first information based on the capability information. This can avoid, to some extent, an energy consumption loss caused when a terminal device that does not have an energy saving working mode receives invalid first data.

With reference to any one of the first embodiment to the sixteenth embodiment of the second aspect, in a seventeenth embodiment, the method further includes: receiving, by the terminal device, second information sent by the network device, where the second information is used to indicate whether the terminal device switches to the energy saving working mode. According to the solution provided in this embodiment, the terminal device enters the energy saving working mode based on the second information sent by the network device, so as to change a working mode of the terminal device by using the first information, thereby reducing energy consumption.

With reference to the seventeenth embodiment of the second aspect, in an eighteenth embodiment, the second information is at least one of a radio resource control (RRC) message, a media access control control element (MAC CE) message, and downlink control information (DCI).

With reference to any one of the first embodiment to the eighteenth embodiment of the second aspect, in a nineteenth embodiment, an implementation in which the terminal device obtains a target state corresponding to a target time period includes: receiving, by the terminal device, third information sent by the network device, where the third information is used to indicate that the terminal device is in a sleep state or a wake-up state. According to the solution provided in this embodiment, when the first information includes only the second field, the terminal device may determine the working state of the terminal device by using the third information currently sent by the network device.

With reference to the nineteenth embodiment of the second aspect, in a twentieth embodiment, the third information is at least one of a radio resource control (RRC) message, a media access control control element (MAC CE) message, and downlink control information (DCI).

With reference to any one of the first embodiment to the twentieth embodiment of the second aspect, in a twenty-first embodiment, the first information is downlink control information (DCI).

With reference to any one of the first embodiment to the twenty-first embodiment of the second aspect, in a twenty-second embodiment, when the first information includes the first field and the first field is the information that indicates the terminal device to go to sleep, the method further includes: abandoning, by the terminal device, reading other information in the first information. According to the solution provided in this embodiment, if the terminal device determines that the network device indicates the terminal device to go to sleep, the network device does not send data to the terminal device, and therefore the terminal device directly enters a sleep state without consuming energy to read other information in the first information. This can further reduce energy consumption of the terminal device.

According to a third aspect, this application provides a communications device, including: a configuration module and a transceiver module. The configuration module is configured to configure first information, where the first information includes a first field and/or a second field, the first field includes information indicating an energy saving state of a terminal device, and the second field includes information indicating a time length in which the terminal device maintains the energy saving state. The transceiver module is configured to send the first information to the terminal device. According to the solution provided in this embodiment, the terminal device can adjust a working state of the terminal device based on the received first information, to reduce energy consumption of the terminal device as much as possible when the network device does not send data to the terminal device.

With reference to the first embodiment of the third aspect, in a second embodiment, all or some bits of the first field are used to indicate the energy saving state information of the terminal device.

With reference to the first embodiment or the second embodiment of the third aspect, in a third embodiment, all or some values of the first field are used to indicate the energy saving state information of the terminal device.

With reference to any one of the first embodiment to the third embodiment of the third aspect, in a fourth embodiment, the first field is a newly added field or an original field in the first information. According to the solution provided in this embodiment, the first information may be configured in a manner of creating a new information format, adding a field to existing information, or reusing an original field. This is relatively flexible.

With reference to any one of the first embodiment to the fourth embodiment of the third aspect, in a fifth embodiment, when the first field is an original field in the first information, the first field is a frequency domain resource allocation field in the first information.

With reference to any one of the first embodiment to the fourth embodiment of the third aspect, in a sixth embodiment, when the first field is a newly added field in the first information, the first information is in a downlink control information format DCI format 2-2. The DCI format 2-2 is group common DCI, and has relatively high deformability. According to the solution provided in this embodiment, an original function of existing DCI is not limited, and the energy saving state of the terminal device can be indicated only by using a newly added field.

With reference to any one of the first embodiment to the sixth embodiment of the third aspect, in a seventh embodiment, the energy saving state information includes: information that indicates the terminal device to go to sleep; or information that indicates the terminal device to wake up.

With reference to any one of the first embodiment to the seventh embodiment of the third aspect, in an eighth embodiment, all or some bits of the second field are used to indicate the information about the time length in which the terminal device maintains the energy saving state.

With reference to any one of the first embodiment to the eighth embodiment of the third aspect, in a ninth embodiment, all or some values of the second field are used to indicate the information about the time length in which the terminal device maintains the energy saving state.

With reference to any one of the first embodiment to the ninth embodiment of the third aspect, in a tenth embodiment, the second field is a newly added field or an original field in the first information.

With reference to any one of the first embodiment to the tenth embodiment of the third aspect, in an eleventh embodiment, when the second field is an original field in the first information, the second field is a frequency domain resource allocation field in the first information.

With reference to any one of the first embodiment to the tenth embodiment of the third aspect, in a twelfth embodiment, when the second field is a newly added field in the first information, the first information is in the downlink control information format 2-2. The DCI format 2-2 is group common DCI, and has relatively high deformability. According to the solution provided in this embodiment, an original function of existing DCI is not limited, and the energy saving state of the terminal device can be indicated only by using a newly added field.

With reference to any one of the first embodiment to the twelfth embodiment of the third aspect, in a thirteenth embodiment, the time length information is: one or more slots; or one or more subframes; or one or more pieces of on duration on duration; or one or more physical downlink control channel (PDCCH) monitoring occasions.

With reference to any one of the first embodiment to the thirteenth embodiment of the third aspect, in a fourteenth embodiment, the first information further includes at least one of the following fields: a bandwidth part indicator field, a sounding reference signal (SRS) request field, a transmit power control command for a preset physical uplink shared channel (TPC command for scheduled PUSCH) field, and an antenna port(s) field.

With reference to any one of the first embodiment to the fourteenth embodiment of the third aspect, in a fifteenth embodiment, the transceiver module is further configured to receive offset duration offset information sent by the terminal device, where the offset information indicates information about a time length between a receiving moment at which the terminal device receives the first information and a preset moment, and the preset moment is the first slot or the first subframe in which the terminal device enters on duration on duration in a discontinuous reception state. According to a possible solution provided in this embodiment, after receiving the offset information, the network device can use the offset information as a reference when determining the first information, so that the first information sent by the network device to the terminal device can meet a requirement on duration in which the terminal device demodulates the first information.

With reference to any one of the first embodiment to the fifteenth embodiment of the third aspect, in a sixteenth embodiment, the transceiver module is further configured to receive capability information sent by the terminal device, where the capability information is used to indicate whether the terminal device has an energy saving working mode. According to the solution provided in this embodiment, the first information may be sent to only a terminal device that has an energy saving working mode. This can reduce a data configuration amount and a data sending amount of the network device, and can avoid an energy consumption loss caused when a terminal device that does not have an energy saving working mode receives invalid first data.

With reference to any one of the first embodiment to the sixteenth embodiment of the third aspect, in a seventeenth embodiment, the transceiver module is further configured to send second information to the terminal device, where the second information is used to indicate whether the terminal device switches to the energy saving working mode. According to the solution provided in this embodiment, the terminal device can be indicated to enter the energy saving working mode, so as to change a working mode of the terminal device by using the first information, thereby reducing energy consumption.

With reference to the seventeenth embodiment of the third aspect, in an eighteenth embodiment, the second information is at least one of a radio resource control (RRC) message, a media access control control element (MAC CE) message, and downlink control information (DCI).

With reference to any one of the first embodiment to the eighteenth embodiment of the third aspect, in a nineteenth embodiment, the transceiver module is further configured to send third information to the terminal device, where the third information is used to indicate that the terminal device is in a sleep state or a wake-up state. According to the solution provided in this embodiment, when the first information includes only the second field, the currently sent third information may be used to notify the terminal device, so that the terminal device determines a target state of the terminal device.

With reference to the nineteenth embodiment of the third aspect, in a twentieth embodiment, the third information is at least one of a radio resource control (RRC) message, a media access control control element (MAC CE) message, and downlink control information (DCI). In other words, the network device may send the third information in any one or more of the foregoing manners. This is relatively flexible.

With reference to any one of the first embodiment to the twentieth embodiment of the third aspect, in a twenty-first embodiment, the first information is downlink control information (DCI).

According to a fourth aspect, this application provides another communications device, including a transceiver module, an obtaining module, and an adjustment module. The transceiver module is configured to receive first information sent by a network device, where the first information includes a first field and/or a second field, the first field includes information indicating an energy saving state of a terminal device, and the second field includes information indicating a time length in which the terminal device maintains the energy saving state. The obtaining module is configured to obtain at least one of the energy saving state information and the time length information based on the first information. The adjustment module is configured to adjust the energy saving state of the terminal device based on the at least one of the energy saving state information and the time length information. According to the solution provided in this embodiment, the terminal device may determine, based on the first information, at least one of the energy saving state and the duration in which the energy saving state is maintained. This reflects whether the network device sends data to the terminal device in the energy saving state and/or within the duration. Therefore, the terminal device only needs to adjust a working state of the terminal device based on the indication of the first information. This can avoid unnecessary energy consumption caused by blind PDCCH detection performed by the terminal device when the network device does not send data to the terminal device, and reduce energy consumption of the terminal device to some extent.

With reference to the first embodiment of the fourth aspect, in a second embodiment, all or some bits of the first field are used to indicate the energy saving state information of the terminal device.

With reference to the first embodiment or the second embodiment of the fourth aspect, in a third embodiment, all or some values of the first field are used to indicate the energy saving state information of the terminal device.

With reference to any one of the first embodiment to the third embodiment of the fourth aspect, in a fourth embodiment, the first field is a newly added field or an original field in the first information. According to the solution provided in this embodiment, the first information may be configured in a manner of creating a new information format, adding a field to existing information, or reusing an original field. This is relatively flexible.

With reference to any one of the first embodiment to the fourth embodiment of the fourth aspect, in a fifth embodiment, when the first field is an original field in the first information, the first field is a frequency domain resource allocation field in the first information.

With reference to any one of the first embodiment to the fourth embodiment of the fourth aspect, in a sixth embodiment, when the first field is a newly added field in the first information, the first information is in a downlink control information format DCI format 2-2. The DCI format 2-2 is group common DCI, and has relatively high deformability. According to the solution provided in this embodiment, an original function of existing DCI is not limited, and the energy saving state of the terminal device can be indicated only by using a newly added field.

With reference to any one of the first embodiment to the sixth embodiment of the fourth aspect, in a seventh embodiment, the energy saving state information includes: information that indicates the terminal device to go to sleep; or information that indicates the terminal device to wake up.

With reference to any one of the first embodiment to the seventh embodiment of the fourth aspect, in an eighth embodiment, all or some bits of the second field are used to indicate the information about the time length in which the terminal device maintains the energy saving state.

With reference to any one of the first embodiment to the eighth embodiment of the fourth aspect, in a ninth embodiment, all or some values of the second field are used to indicate the information about the time length in which the terminal device maintains the energy saving state.

With reference to any one of the first embodiment to the ninth embodiment of the fourth aspect, in a tenth embodiment, the second field is a newly added field or an original field in the first information.

With reference to any one of the first embodiment to the tenth embodiment of the fourth aspect, in an eleventh embodiment, when the second field is an original field in the first information, the second field is a frequency domain resource allocation field in the first information.

With reference to any one of the first embodiment to the tenth embodiment of the fourth aspect, in a twelfth embodiment, when the second field is a newly added field in the first information, the first information is in the downlink control information format 2-2. The DCI format 2-2 is group common DCI, and has relatively high deformability. According to the solution provided in this embodiment, an original function of existing DCI is not limited, and the energy saving state of the terminal device can be indicated only by using a newly added field.

With reference to any one of the first embodiment to the twelfth embodiment of the fourth aspect, in a thirteenth embodiment, the time length information is: one or more slots; or one or more subframes; or one or more pieces of on duration on duration; or one or more physical downlink control channel (PDCCH) monitoring occasions.

With reference to any one of the first embodiment to the thirteenth embodiment of the fourth aspect, in a fourteenth embodiment, the first information further includes at least one of the following fields: a bandwidth part indicator field, a sounding reference signal (SRS) request field, a transmit power control command for a preset physical uplink shared channel (TPC command for scheduled PUSCH) field, and an antenna port(s) field.

With reference to any one of the first embodiment to the fourteenth embodiment of the fourth aspect, in a fifteenth embodiment, the transceiver module is further configured to send offset duration offset information to the network device, where the offset information indicates information about a time length between a receiving moment at which the terminal device receives the first information and a preset moment, and the preset moment is the first slot or the first subframe in which the terminal device enters on duration on duration in a discontinuous reception state. According to a possible solution provided in this embodiment, after receiving the offset information, the network device can use the offset information as a reference when determining the first information, so that the first information sent by the network device to the terminal device can meet a requirement on duration in which the terminal device demodulates the first information.

With reference to any one of the first embodiment to the fifteenth embodiment of the fourth aspect, in a sixteenth embodiment, the transceiver module is further configured to send capability information to the network device, where the capability information is used to indicate whether the terminal device has an energy saving working mode. According to the solution provided in this embodiment, the terminal device may report, to the network device, the capability information indicating whether the terminal device has the energy saving working mode, so that the network device can determine a configuration amount and a sending amount of the first information based on the capability information. This can avoid, to some extent, an energy consumption loss caused when a terminal device that does not have an energy saving working mode receives invalid first data.

With reference to any one of the first embodiment to the sixteenth embodiment of the fourth aspect, in a seventeenth embodiment, the transceiver module is further configured to receive second information sent by the network device, where the second information is used to indicate whether the terminal device switches to the energy saving working mode. According to the solution provided in this embodiment, the terminal device enters the energy saving working mode based on the second information sent by the network device, so as to change a working mode of the terminal device by using the first information, thereby reducing energy consumption.

With reference to the seventeenth embodiment of the fourth aspect, in an eighteenth embodiment, the second information is at least one of a radio resource control (RRC) message, a media access control control element (MAC CE) message, and downlink control information (DCI).

With reference to any one of the first embodiment to the eighteenth embodiment of the fourth aspect, in a nineteenth embodiment, the transceiver module is further configured to receive third information sent by the network device, where the third information is used to indicate that the terminal device is in a sleep state or a wake-up state. According to the solution provided in this embodiment, when the first information includes only the second field, the terminal device may determine the working state of the terminal device by using the third information currently sent by the network device.

With reference to the nineteenth embodiment of the fourth aspect, in a twentieth embodiment, the third information is at least one of a radio resource control (RRC) message, a media access control control element (MAC CE) message, and downlink control information (DCI).

With reference to any one of the first embodiment to the twentieth embodiment of the fourth aspect, in a twenty-first embodiment, the first information is downlink control information (DCI).

With reference to any one of the first embodiment to the twenty-first embodiment of the fourth aspect, in a twenty-second embodiment, when the first information includes the first field and the first field is the information that indicates the terminal device to go to sleep, the obtaining module is further configured to abandon reading other information in the first information. According to the solution provided in this embodiment, if the terminal device determines that the network device indicates the terminal device to go to sleep, the network device does not send data to the terminal device, and therefore the terminal device directly enters a sleep state without consuming energy to read other information in the first information. This can further reduce energy consumption of the terminal device.

According to a fifth aspect, this application provides a communications device, including a memory and a processor.

The memory is coupled to the processor.

The processor is configured to perform the following method.

With reference to the method in the first aspect, in a first embodiment, the processor is used as a configuration module and a transceiver module. The configuration module is configured to configure first information, where the first information includes a first field and/or a second field, the first field includes information indicating an energy saving state of a terminal device, and the second field includes information indicating a time length in which the terminal device maintains the energy saving state. In addition, the transceiver module is configured to send the first information to the terminal device. According to the solution provided in this embodiment, the terminal device can adjust a working state of the terminal device based on the received first information, to reduce energy consumption of the terminal device as much as possible when the network device does not send data to the terminal device.

With reference to the first embodiment of the first aspect, in a second embodiment, all or some bits of the first field are used to indicate the energy saving state information of the terminal device.

With reference to the first embodiment or the second embodiment of the first aspect, in a third embodiment, all or some values of the first field are used to indicate the energy saving state information of the terminal device.

With reference to any one of the first embodiment to the third embodiment of the first aspect, in a fourth embodiment, the first field is a newly added field or an original field in the first information. According to the solution provided in this embodiment, the first information may be configured in a manner of creating a new information format, adding a field to existing information, or reusing an original field. This is relatively flexible.

With reference to any one of the first embodiment to the fourth embodiment of the first aspect, in a fifth embodiment, when the first field is an original field in the first information, the first field is a frequency domain resource allocation field in the first information.

With reference to any one of the first embodiment to the fourth embodiment of the first aspect, in a sixth embodiment, when the first field is a newly added field in the first information, the first information is in a downlink control information format DCI format 2-2. The DCI format 2-2 is group common DCI, and has relatively high deformability. According to the solution provided in this embodiment, an original function of existing DCI is not limited, and the energy saving state of the terminal device can be indicated only by using a newly added field.

With reference to any one of the first embodiment to the sixth embodiment of the first aspect, in a seventh embodiment, the energy saving state information includes: information that indicates the terminal device to go to sleep; or information that indicates the terminal device to wake up.

With reference to any one of the first embodiment to the seventh embodiment of the first aspect, in an eighth embodiment, all or some bits of the second field are used to indicate the information about the time length in which the terminal device maintains the energy saving state.

With reference to any one of the first embodiment to the eighth embodiment of the first aspect, in a ninth embodiment, all or some values of the second field are used to indicate the information about the time length in which the terminal device maintains the energy saving state.

With reference to any one of the first embodiment to the ninth embodiment of the first aspect, in a tenth embodiment, the second field is a newly added field or an original field in the first information.

With reference to any one of the first embodiment to the tenth embodiment of the first aspect, in an eleventh embodiment, when the second field is an original field in the first information, the second field is a frequency domain resource allocation field in the first information.

With reference to any one of the first embodiment to the tenth embodiment of the first aspect, in a twelfth embodiment, when the second field is a newly added field in the first information, the first information is in the downlink control information format 2-2. The DCI format 2-2 is group common DCI, and has relatively high deformability. According to the solution provided in this embodiment, an original function of existing DCI is not limited, and the energy saving state of the terminal device can be indicated only by using a newly added field.

With reference to any one of the first embodiment to the twelfth embodiment of the first aspect, in a thirteenth embodiment, the time length information is: one or more slots; or one or more subframes; or one or more pieces of on duration on duration; or one or more physical downlink control channel (PDCCH) monitoring occasions.

With reference to any one of the first embodiment to the thirteenth embodiment of the first aspect, in a fourteenth embodiment, the first information further includes at least one of the following fields: a bandwidth part indicator field, a sounding reference signal (SRS) request field, a transmit power control command for a preset physical uplink shared channel (TPC command for scheduled PUSCH) field, and an antenna port(s) field.

With reference to any one of the first embodiment to the fourteenth embodiment of the first aspect, in a fifteenth embodiment, the processor is further configured to receive offset duration offset information sent by the terminal device, where the offset information indicates information about a time length between a receiving moment at which the terminal device receives the first information and a preset moment, and the preset moment is the first slot or the first subframe in which the terminal device enters on duration on duration in a discontinuous reception state.

According to a possible solution provided in this embodiment, after receiving the offset information, the network device can use the offset information as a reference when determining the first information, so that the first information sent by the network device to the terminal device can meet a requirement on duration in which the terminal device demodulates the first information.

With reference to any one of the first embodiment to the fifteenth embodiment of the first aspect, in a sixteenth embodiment, the processor is further configured to receive capability information sent by the terminal device, where the capability information is used to indicate whether the terminal device has an energy saving working mode. According to the solution provided in this embodiment, the first information may be sent to only a terminal device that has an energy saving working mode. This can reduce a data configuration amount and a data sending amount of the network device, and can avoid an energy consumption loss caused when a terminal device that does not have an energy saving working mode receives invalid first data.

With reference to any one of the first embodiment to the sixteenth embodiment of the first aspect, in a seventeenth embodiment, the processor is further configured to send second information to the terminal device, where the second information is used to indicate whether the terminal device switches to the energy saving working mode. According to the solution provided in this embodiment, the terminal device can be indicated to enter the energy saving working mode, so as to change a working mode of the terminal device by using the first information, thereby reducing energy consumption.

With reference to the seventeenth embodiment of the first aspect, in an eighteenth embodiment, the second information is at least one of a radio resource control (RRC) message, a media access control control element (MAC CE) message, and downlink control information (DCI).

With reference to any one of the first embodiment to the eighteenth embodiment of the first aspect, in a nineteenth embodiment, the processor is further configured to send third information to the terminal device, where the third information is used to indicate that the terminal device is in a sleep state or a wake-up state. According to the solution provided in this embodiment, when the first information includes only the second field, the currently sent third information may be used to notify the terminal device, so that the terminal device determines a target state of the terminal device.

With reference to the nineteenth embodiment of the first aspect, in a twentieth embodiment, the third information is at least one of a radio resource control (RRC) message, a media access control control element (MAC CE) message, and downlink control information (DCI). In other words, the network device may send the third information in any one or more of the foregoing manners. This is relatively flexible.

With reference to any one of the first embodiment to the twentieth embodiment of the first aspect, in a twenty-first embodiment, the first information is downlink control information (DCI).

Alternatively, the processor is configured to perform the following method.

With reference to the method in the second aspect, in a first embodiment, the processor is configured to: receive first information sent by a network device, where the first information includes a first field and/or a second field, the first field includes information indicating an energy saving state of a terminal device, and the second field includes information indicating a time length in which the terminal device maintains the energy saving state; obtain at least one of the energy saving state information and the time length information based on the first information; an adjust the energy saving state of the terminal device based on the at least one of the energy saving state information and the time length information. According to the solution provided in this embodiment, the terminal device may determine, based on the first information, at least one of the energy saving state and the duration in which the energy saving state is maintained. This reflects whether the network device sends data to the terminal device in the energy saving state and/or within the duration. Therefore, the terminal device only needs to adjust a working state of the terminal device based on the indication of the first information. This can avoid unnecessary energy consumption caused by blind PDCCH detection performed by the terminal device when the network device does not send data to the terminal device, and reduce energy consumption of the terminal device to some extent.

With reference to the first embodiment of the second aspect, in a second embodiment, all or some bits of the first field are used to indicate the energy saving state information of the terminal device.

With reference to the first embodiment or the second embodiment of the second aspect, in a third embodiment, all or some values of the first field are used to indicate the energy saving state information of the terminal device.

With reference to any one of the first embodiment to the third embodiment of the second aspect, in a fourth embodiment, the first field is a newly added field or an original field in the first information. According to the solution provided in this embodiment, the first information may be configured in a manner of creating a new information format, adding a field to existing information, or reusing an original field. This is relatively flexible.

With reference to any one of the first embodiment to the fourth embodiment of the second aspect, in a fifth embodiment, when the first field is an original field in the first information, the first field is a frequency domain resource allocation field in the first information.

With reference to any one of the first embodiment to the fourth embodiment of the second aspect, in a sixth embodiment, when the first field is a newly added field in the first information, the first information is in a downlink control information format DCI format 2-2. The DCI format 2-2 is group common DCI, and has relatively high deformability. According to the solution provided in this embodiment, an original function of existing DCI is not limited, and the energy saving state of the terminal device can be indicated only by using a newly added field.

With reference to any one of the first embodiment to the sixth embodiment of the second aspect, in a seventh embodiment, the energy saving state information includes: information that indicates the terminal device to go to sleep; or information that indicates the terminal device to wake up.

With reference to any one of the first embodiment to the seventh embodiment of the second aspect, in an eighth embodiment, all or some bits of the second field are used to indicate the information about the time length in which the terminal device maintains the energy saving state.

With reference to any one of the first embodiment to the eighth embodiment of the second aspect, in a ninth embodiment, all or some values of the second field are used to indicate the information about the time length in which the terminal device maintains the energy saving state.

With reference to any one of the first embodiment to the ninth embodiment of the second aspect, in a tenth embodiment, the second field is a newly added field or an original field in the first information.

With reference to any one of the first embodiment to the tenth embodiment of the second aspect, in an eleventh embodiment, when the second field is an original field in the first information, the second field is a frequency domain resource allocation field in the first information.

With reference to any one of the first embodiment to the tenth embodiment of the second aspect, in a twelfth embodiment, when the second field is a newly added field in the first information, the first information is in the downlink control information format 2-2. The DCI format 2-2 is group common DCI, and has relatively high deformability. According to the solution provided in this embodiment, an original function of existing DCI is not limited, and the energy saving state of the terminal device can be indicated only by using a newly added field.

With reference to any one of the first embodiment to the twelfth embodiment of the second aspect, in a thirteenth embodiment, the time length information is: one or more slots; or one or more subframes; or one or more pieces of on duration on duration; or one or more physical downlink control channel (PDCCH) monitoring occasions.

With reference to any one of the first embodiment to the thirteenth embodiment of the second aspect, in a fourteenth embodiment, the first information further includes at least one of the following fields: a bandwidth part indicator field, a sounding reference signal (SRS) request field, a transmit power control command for a preset physical uplink shared channel (TPC command for scheduled PUSCH) field, and an antenna port(s) field.

With reference to any one of the first embodiment to the fourteenth embodiment of the second aspect, in a fifteenth embodiment, the processor is further configured to send offset duration offset information to the network device, where the offset information indicates information about a time length between a receiving moment at which the terminal device receives the first information and a preset moment, and the preset moment is the first slot or the first subframe in which the terminal device enters on duration on duration in a discontinuous reception state. According to a possible solution provided in this embodiment, after receiving the offset information, the network device can use the offset information as a reference when determining the first information, so that the first information sent by the network device to the terminal device can meet a requirement on duration in which the terminal device demodulates the first information.

With reference to any one of the first embodiment to the fifteenth embodiment of the second aspect, in a sixteenth embodiment, the processor is further configured to send capability information to the network device, where the capability information is used to indicate whether the terminal device has an energy saving working mode. According to the solution provided in this embodiment, the terminal device may report, to the network device, the capability information indicating whether the terminal device has the energy saving working mode, so that the network device can determine a configuration amount and a sending amount of the first information based on the capability information. This can avoid, to some extent, an energy consumption loss caused when a terminal device that does not have an energy saving working mode receives invalid first data.

With reference to any one of the first embodiment to the sixteenth embodiment of the second aspect, in a seventeenth embodiment, the processor is further configured to receive second information sent by the network device, where the second information is used to indicate whether the terminal device switches to the energy saving working mode. According to the solution provided in this embodiment, the terminal device enters the energy saving working mode based on the second information sent by the network device, so as to change a working mode of the terminal device by using the first information, thereby reducing energy consumption.

With reference to the seventeenth embodiment of the second aspect, in an eighteenth embodiment, the second information is at least one of a radio resource control (RRC) message, a media access control control element (MAC CE) message, and downlink control information (DCI).

With reference to any one of the first embodiment to the eighteenth embodiment of the second aspect, in a nineteenth embodiment, the processor is further configured to receive third information sent by the network device, where the third information is used to indicate that the terminal device is in a sleep state or a wake-up state. According to the solution provided in this embodiment, when the first information includes only the second field, the terminal device may determine the working state of the terminal device by using the third information currently sent by the network device.

With reference to the nineteenth embodiment of the second aspect, in a twentieth embodiment, the third information is at least one of a radio resource control (RRC) message, a media access control control element (MAC CE) message, and downlink control information (DCI).

With reference to any one of the first embodiment to the twentieth embodiment of the second aspect, in a twenty-first embodiment, the first information is downlink control information (DCI).

With reference to any one of the first embodiment to the twenty-first embodiment of the second aspect, in a twenty-second embodiment, when the first information includes the first field and the first field is the information that indicates the terminal device to go to sleep, the processor is further configured to abandon reading other information in the first information. According to the solution provided in this embodiment, if the terminal device determines that the network device indicates the terminal device to go to sleep, the network device does not send data to the terminal device, and therefore the terminal device directly enters a sleep state without consuming energy to read other information in the first information. This can further reduce energy consumption of the terminal device.

In a possible design, the communications device in the fifth aspect may be a core network node, a base station, or a terminal device, or may be a component (for example, a chip or a circuit) of a core network node, a base station, or a terminal device.

According to a sixth aspect, this application provides a computer-readable storage medium. The computer-readable storage medium stores a computer program. When the computer program is run on a computer, the computer is enabled to perform the method according to the first aspect or the second aspect.

According to a seventh aspect, this application provides a computer program. When the computer program is executed by a computer, the computer is configured to perform the method according to the first aspect or the second aspect.

According to the foregoing aspects and any possible implementation, an implementation is further provided. The program in the seventh aspect may be completely or partially stored in a storage medium that is encapsulated with a processor, or may be partially or completely stored in a memory that is not encapsulated with a processor.

According to an eighth aspect, an embodiment of this application further provides a communications system, including the communications device according to the third aspect or the fourth aspect.

According to a ninth aspect, this application provides a chip, including a memory and a processor. The memory is coupled to the processor.

The processor is configured to perform the method according to the first aspect or the second aspect.

It can be learned that, in the foregoing aspects, the first information configured by the network device for the terminal device includes the first field and/or the second field, the first field includes the energy saving state information that indicates the terminal device to go to sleep or wake up, and the second field includes the information indicating the time length in which the terminal device maintains the energy saving state. In this way, the terminal device may determine, based on the first information, the at least one of the energy saving state and the duration in which the energy saving state is maintained. This reflects whether the network device sends data to the terminal device in the energy saving state and/or within the duration. Therefore, the terminal device only needs to adjust the working state of the terminal device based on the indication of the first information. This can avoid unnecessary energy consumption caused by blind PDCCH detection performed by the terminal device when the network device does not send data to the terminal device. In other words, the technical solutions provided in the embodiments of this application can reduce energy consumption of the terminal device to some extent.

DESCRIPTION OF EMBODIMENTS

Terms used in implementations of this application are merely used to explain specific embodiments of this application, but are not intended to limit this application.

Figure 1:
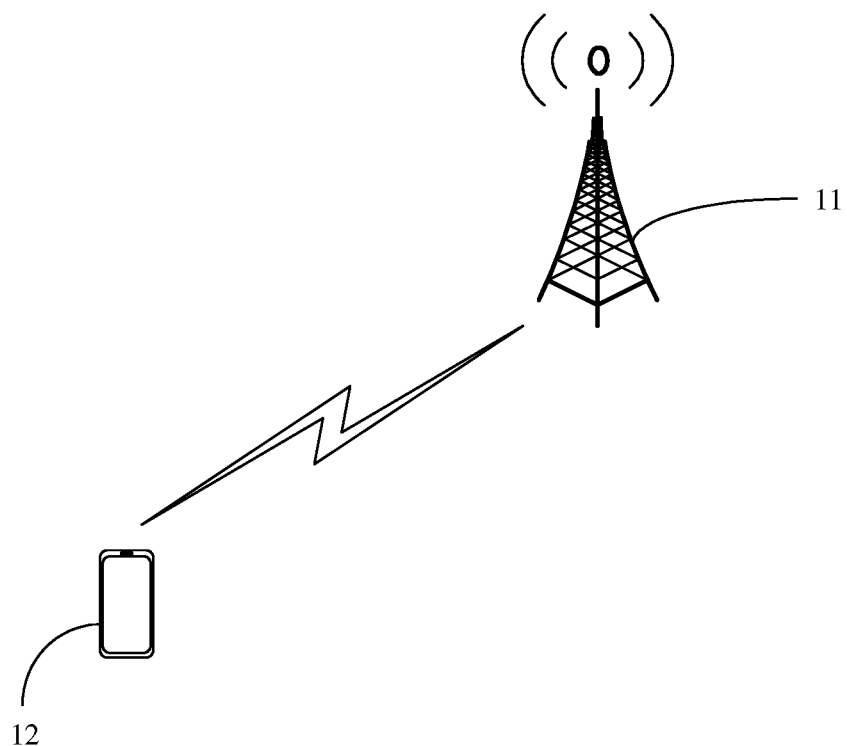
FIG. 1 is a schematic diagram of an application scenario according to an embodiment of this application.

The embodiments of this application may be applied to various communications systems. FIG. 1 is a schematic diagram of an application scenario according to an embodiment of this application. A communications system shown in FIG. 1 mainly includes a network device 11 and a terminal device 12.

(1) The network device 11 may be a network side device, for example, a wireless fidelity (WI-FI) access point (AP), or a next-generation communications base station such as a gNB, a small cell, a micro base station, or a TRP in 5G, or may be a relay station, an access point, a vehicle-mounted device, a wearable device, or the like. In this embodiment, communications systems of different communications standards have different base stations. For ease of differentiation, a base station in a 4G communications system is referred to as an LTE eNB, a base station in a 5G communications system is referred to as an NR gNB, and a base station that supports both the 4G communications system and the 5G communications system is referred to as an eLTE eNB. These names are merely used for ease of differentiation, and do not have limitation meanings.

(2) The terminal device 12 is also referred to as user equipment (UE), and is a device that provides a user with voice and/or data connectivity, for example, a handheld device or a vehicle-mounted device having a wireless connection function. Common terminal devices include a mobile phone, a tablet, a notebook computer, a palmtop computer, a mobile internet device (MID), a wearable device such as a smartwatch, a smart band, or a pedometer, and the like.

(3) The term "a plurality of" indicates two or more, and another quantifier is similar to the term "a plurality of". The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

It should be noted that a quantity of terminal devices 12 included in the communications system shown in FIG. 1 and types of the terminal devices 12 are merely an example. This embodiment of this application is not limited thereto. For example, the communications system may further include more terminal devices 12 that communicate with the network device 11. In addition, although the network device 11 and the terminal device 12 are shown in the communications system shown in FIG. 1, the communications system may not be limited to the network device 11 and the terminal device 12, for example, may further include a core network node, or a device configured to carry a virtualized network function.

In addition, the embodiments of this application may be applied to not only a next-generation wireless communications system, that is, the 5G communications system, but also another system that may appear in the future, for example, a next-generation Wi-Fi network or a 5G internet of vehicles.

It should be noted that, with continuous evolution of a communications system, names of the network device and the terminal device may change in another system that may appear in the future. In this case, the solutions provided in the embodiments of this application are also applicable.

The following briefly describes an implementation scenario of this application.

In a process in which a network device communicates with a terminal device, a base station sends DCI to the terminal device, and the DCI is used to indicate a specific time-frequency resource location and a specific configuration parameter used by the terminal device to receive and demodulate downlink data. Therefore, the terminal device needs to continually perform blind PDCCH detection, to determine whether there is DCI sent to the terminal device, so that the terminal device can receive and demodulate the downlink data based on the received DCI.

However, for any terminal device, an amount of DCI sent by the base station, a moment at which the base station sends the DCI, and an object to which the base station sends the DCI are not determined. Therefore, the terminal device needs to continually perform blind PDCCH detection. Consequently, a large amount of energy of the terminal device is consumed.

Figure 2:
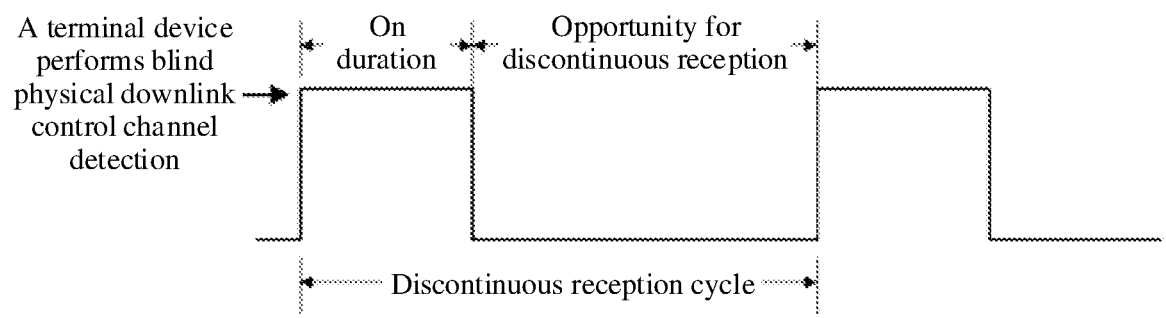
FIG. 2 is a schematic structural diagram of a discontinuous reception cycle according to an embodiment of this application.

In addition, in an existing technology branch of a 5G NR technology, to reduce energy consumption of the terminal device, a discontinuous reception (DRX) mechanism in a long term evolution (LTE) technology is still used. Referring to FIG. 2, a base station configures one DRX cycle for a terminal device that is in a radio resource control (RRC) connected mode, and each DRX cycle includes an "on duration" part and an "opportunity for DRX" part. The terminal device monitors and receives a physical downlink control channel (PDCCH) within the "on duration", and the terminal device may not monitor or receive a PDCCH within the "opportunity for DRX" to reduce energy consumption. The DRX mechanism may be implemented by using an on duration timer (or drx-on Duration Timer). Specifically, at the beginning of each DRX cycle (that is, at the beginning of the on duration of each DRX cycle), the terminal device needs to start the on duration timer. When the on duration timer expires, it indicates that the "on duration" ends. In this case, the terminal device enters the "opportunity for DRX".

In addition, the DRX cycle may be a long DRX cycle, or may be a short DRX cycle. A long DRX cycle is generally a default mandatory configuration manner, and a short DRX cycle is an optional configuration manner. If a short DRX cycle is configured, the terminal device starts a short cycle timer in the short DRX cycle, and switches to a long DRX cycle when the short cycle timer expires.

In an existing energy saving solution, a DRX cycle is formulated. However, if no data is transmitted between the base station and the terminal device within on duration in a DRX cycle or even in an entire DRX cycle, energy consumed by the terminal device within the on duration in the DRX cycle is wasted, and consequently energy consumption of the terminal device is relatively high.

An information sending and receiving method provided in this application is intended to resolve the foregoing technical problem in the prior art, and the following solution idea is provided: Information sent by a network device to a terminal device carries energy saving state information that indicates the terminal device to go to sleep or wake up and/or information about duration in which an energy saving state is maintained. Therefore, after receiving the message, the terminal device may adjust a working state of the terminal device based on the message, thereby reducing energy consumption of the terminal device.

By using specific embodiments, the following describes in detail the technical solutions of this application and how to resolve the foregoing technical problem by using the technical solutions of this application. The following several specific embodiments may be combined with each other, and a same or similar concept or process may not be described repeatedly in some embodiments. The following describes the embodiments of this application with reference to the accompanying drawings.

Figure 3:
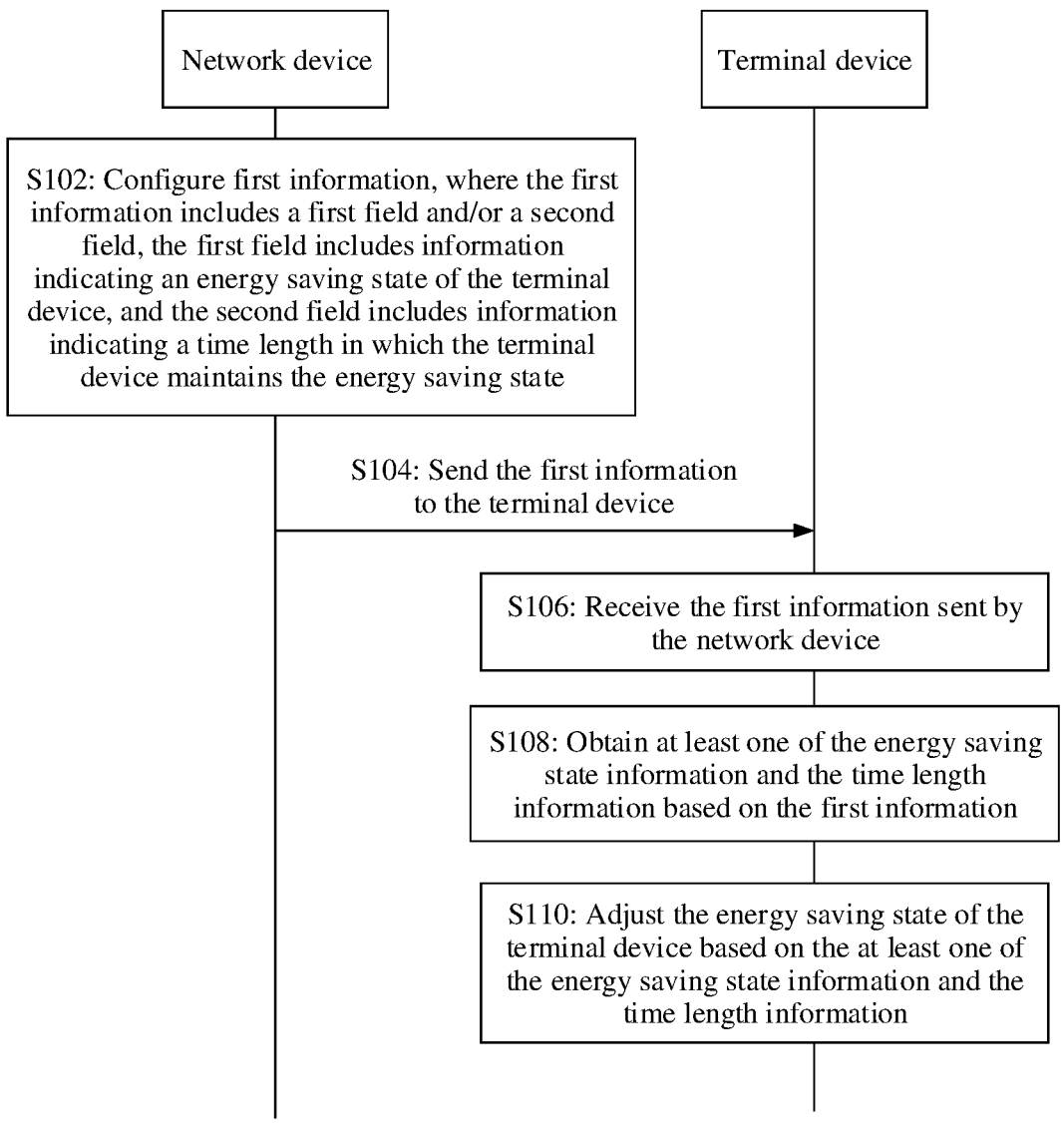
FIG. 3 is a schematic interaction flowchart of an information sending and receiving method according to an embodiment of this application.

An embodiment of this application provides an information sending and receiving method. The following specifically describes the method by using a scenario of interaction between a network device and a terminal device shown in FIG. 1 as an example. Referring to FIG. 3, the method may include the following procedure.

S102: A network device configures first information, where the first information includes a first field and/or a second field, the first field includes information indicating an energy saving state of a terminal device, and the second field includes information indicating a time length in which the terminal device maintains the energy saving state.

The energy saving state information is information that indicates the terminal device to wake up/wake up, or information that indicates the terminal device to go to sleep/go to sleep.

Correspondingly, the energy saving state of the terminal device includes a sleep state or a wake-up state. When the terminal device is in a sleep state, the terminal device does not monitor or receive a PDCCH to reduce energy consumption. Alternatively, when the terminal device is in a wake-up state, the terminal device starts to monitor and receive a PDCCH.

In this embodiment of this application, the network device may configure the first information based on a status that the network device sends data to the terminal device.

S104: The network device sends the first information to the terminal device.

S106: The terminal device receives the first information sent by the network device.

S108: The terminal device obtains at least one of the energy saving state information and the time length information based on the first information.

S110: The terminal device adjusts the energy saving state of the terminal device based on the at least one of the energy saving state information and the time length information.

When the first information carries the first field, if the energy saving state information is the information that indicates the terminal device to wake up, the terminal device adjusts the energy saving state of the terminal device to a wake-up state. On the contrary, if the energy saving state information is the information that indicates the terminal device to go to sleep, the terminal device adjusts the energy saving state of the terminal device to a sleep state.

In the foregoing steps, the network device configures the first field based on whether the network device sends data to the terminal device; and/or configures the second field based on a specific time period in which the network device sends or stops sending data to the terminal device, and sends the information to the terminal device. Correspondingly, the terminal device adjusts the energy saving state of the terminal device based on the received first information, so that blind PDCCH detection can be stopped when there is no data to be received, thereby reducing power consumption.

The following specifically describes implementations of the foregoing steps.

For an implementation of configuring the first information in step S102, there are three aspects below:

A first aspect is configuring the first field.

The energy saving state information included in the first field is the information that indicates the terminal device to go to sleep, or the information that indicates the terminal device to wake up. It is considered that the terminal device performs blind PDCCH detection to receive data sent by the network device. Therefore, the network device may determine content of the first field based on whether the network device sends data to the terminal device. Correspondingly, the terminal device may determine, based on the first information, whether the network device sends data to the terminal device, and adjust the energy saving state of the terminal device (to a sleep state or a wake-up state) based on the first information, thereby reducing energy consumption.

A manner of representing the energy saving state information is not particularly limited in this embodiment of this application. For example, bit information may be used to indicate the terminal device to go to sleep or wake up. For example, 1-bit information is used to indicate the energy saving state information. For example, "0" is used to indicate the terminal device to go to sleep, and "1" is used to indicate the terminal device to wake up. Alternatively, different values are used to indicate the device to go to sleep or wake up. Alternatively, two different identifiers may be used to indicate the terminal device to go to sleep or wake up. For example, "+" is used to indicate the terminal device to go to sleep, and "−" is used to indicate the terminal device to wake up. Alternatively, text information may be used to directly indicate the terminal device to go to sleep or wake up.

It should be noted that the first field in this embodiment of this application may be a newly added field or an original field in the first information. In this case, the network device may configure the first field in the first information in at least the following three manners:

In a first manner, new first information used to indicate the energy saving state of the terminal device is designed.

In this implementation, a field quantity, a field location, and a definition of each field of the first information may be configured as required. Essentially, a new information format is designed.

Figure 4:
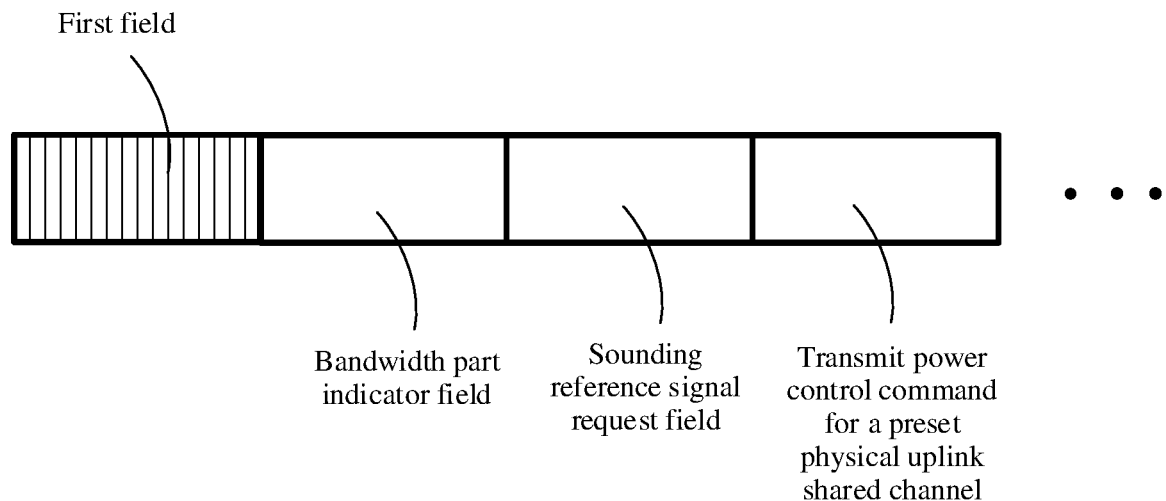
FIG. 4 is a schematic structural diagram of first information according to an embodiment of this application.

An example in which the first information is DCI is still used. Referring to FIG. 4, the $1^{st}$ field in the first information includes the information that indicates the terminal device to go to sleep or wake up, which is the first field.

In addition, in a feasible implementation, the first information may be downlink control information (DCI). In this case, if the first information is in a newly designed DCI format, the first information may further include other fields, and these fields may be defined as required. For example, when the first field indicates the terminal to go to sleep, the terminal device needs to adjust the energy saving state of the terminal device to a sleep state. In this case, other fields may be ignored or may not be configured. This can make configuration of the network device easier and improve configuration efficiency. On the contrary, if the first field indicates the terminal to wake up, the terminal device needs to adjust the energy saving state of the terminal device to a wake-up state. In this case, the terminal device needs to monitor and receive a PDCCH, and therefore needs to read another field in the first information, and the network device further needs to configure, in the first information, information such as a specific time-frequency resource location and a specific configuration parameter used by the terminal device to receive and demodulate downlink data.

Therefore, in a specific implementation scenario, the first information may further include one or more of the following fields:

a bandwidth part indicator (BWP indicator) field, a sounding reference signal request (SRS request) field, a transmit power control command for a preset physical uplink shared channel (TPC command for scheduled PUSCH) field, and an antenna port(s) field.

When the first field indicates the terminal device to wake up, the bandwidth part indicator field is used to indicate a BWP of downlink data that the terminal device needs to receive subsequently, and the terminal device may correspondingly receive the downlink data at the BWP; the SRS request field is used to indicate the terminal device to perform aperiodic SRS sending; and the TPC command for scheduled PUSCH field is used to indicate a power adjustment value for scheduling uplink data sending.

The foregoing fields are merely preferred fields. During actual implementation of this solution, the first information may further include another field.

Optionally, the first information may further include one or more of the following fields: a bandwidth part indicator (BWP indicator) field, a sounding reference signal request (SRS request) field, a transmit power control command for a preset physical uplink shared channel (TPC command for scheduled PUSCH) field, an antenna port(s) field, a synchronization signal/broadcast channel indicator (SS/PBCH index) field, a short message field, a modulation and coding scheme (MCS) field, a downlink assignment index (DAI) field, a transmitted precoding matrix indicator (TPMI) acknowledgment field, a precoding matrix indicator (PMI) acknowledgment field, a downlink power compensation (Downlink power offset) field, a hybrid automatic repeat request (HARQ) process number field, a transport block to codeword swap flag field, a precoding information field, a transmit power control (TPC) field, a scrambling identity field, an antenna port(s), scrambling identity and number of layers field, a physical downlink shared channel resource element mapping and quasi-co-location indicator field, a demodulation reference signal phase rotation and OCC index (Cyclic shift for Demodulation Reference Signal and Orthogonal Cover Code index) field, an uplink index (ULI) field, a downlink assignment index (DAI) field, a channel state information request field, and the like.

In an optional implementation scenario, the first information may be configured in a manner shown in FIG. 4. To be specific, in addition to the first field, the first information further includes the foregoing fields.

It should be noted that a configuration location of each field in the first information may be set as required. For example, the first field may be configured in any field in the first information. Specifically, as shown in FIG. 4, the first field may be configured in an initial field of the first information, or the first field may be configured at any location in the middle of the first information, or the first field may be configured at an end location of the first information.

In the configuration manner shown in FIG. 4, the first field is configured in the initial field of the first information. This can help the terminal device quickly determine to adjust the energy saving state of the terminal device to a wake-up state or a sleep state after receiving the first information. Therefore, when the terminal device specifically maintains the energy saving state, the terminal device may read or abandon reading information carried in another field of the first information, thereby further reducing energy consumption. In this way, if the first field is the initial field of the first information and the first field is the information that indicates the terminal device to go to sleep, after reading the first information, the terminal device determines to adjust the energy saving state of the terminal device to a sleep state. Therefore, the terminal device directly controls the terminal device to enter a sleep mode without a need of reading a subsequent field. This can reduce an amount of data processed by the terminal device, and reduce energy consumption of the terminal device.

That the first field in this embodiment of this application includes the information indicating the energy saving state of the terminal device may include but is not limited to the following configuration manners:

using all or some bits of the first field to indicate the energy saving state information of the terminal device; and/or using all or some values of the first field to indicate the energy saving state information of the terminal device.

When a part of the first field is used to indicate the energy saving state information of the terminal device, other bits of the first field may be used to carry other information, or other bits of the first field may be empty, in other words, do not carry information.

In addition, when some values of the first field are used to indicate the energy saving state information of the terminal device, other values of the first field may be used to carry other information.

Therefore, this embodiment of this application provides a feasible solution for a combination of the foregoing two configuration manners.

For example, all bits and all data of the first field are used to indicate the energy saving state information of the terminal device.

Alternatively, for another example, some bits and all values of the first field are used to indicate the energy saving state information of the terminal device. In this case, other bits of the first field have no data.

It can be learned that a configuration manner of another field is the same as that of the first field.

In this implementation, a meaning of each field in the first information may be defined as required. Compared with an existing DCI format, the first information defined in this manner can reduce fields included in the DCI format to some extent, so that the terminal device enables a minimum quantity of functions, thereby achieving energy saving. In addition, a user-defined manner is relatively flexible.

In a second manner, a new field is added to existing information to obtain the first information.

Figure 5:
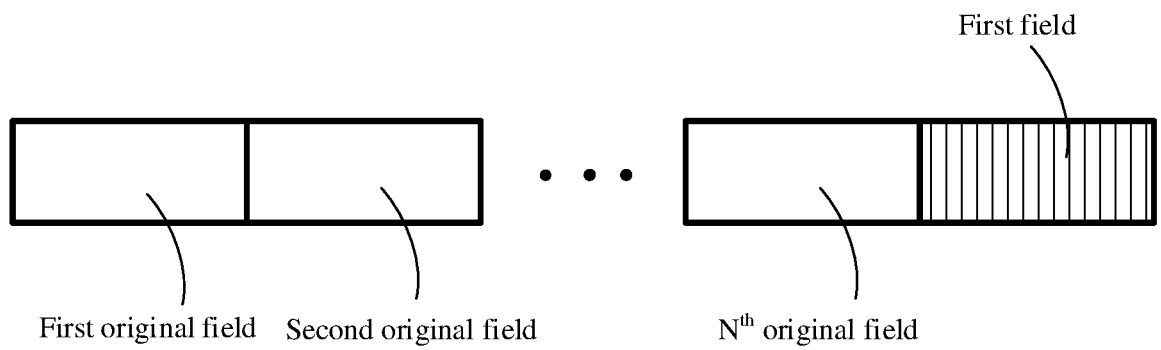
FIG. 5 is a schematic structural diagram of another first information according to an embodiment of this application.

For ease of understanding, refer to a schematic structural diagram of first information shown in FIG. 5. The first information includes (N+1) fields in total, where N is an integer greater than or equal to 1. The first N fields of the first information are all fields in existing DCI, and an $(N+1)^{th}$ field is the first field described in this application. The field is a newly added field in the existing DCI, and specifically includes the information that indicates the terminal device to go to sleep or wake up.

In addition, it should be further noted that a location of the newly added field is not particularly limited in this embodiment of this application. As shown in FIG. 5, a manner of configuring the newly added first field at an end location of the existing DCI is merely a feasible implementation. In addition, the newly added field may be alternatively configured at a start location of the existing DCI, or the newly added field may be configured at any location in the middle of the existing DCI.

An existing DCI format includes a DCI format for a group, for example, a DCI format 2-2. A field length of the DCI format is variable, a base station configures different format lengths for different quantities of terminals in the group, and information in the DCI format may be used to simultaneously indicate a plurality of terminals. Therefore, in a preferred implementation process, if the first field is a newly added field in the first information, the first information may be in but is not limited to being in the DCI format 2-2. When the first information is in the DCI format 2-2, a plurality of first fields may be added to indicate energy saving state information of different terminals in the group.

Figure 6:
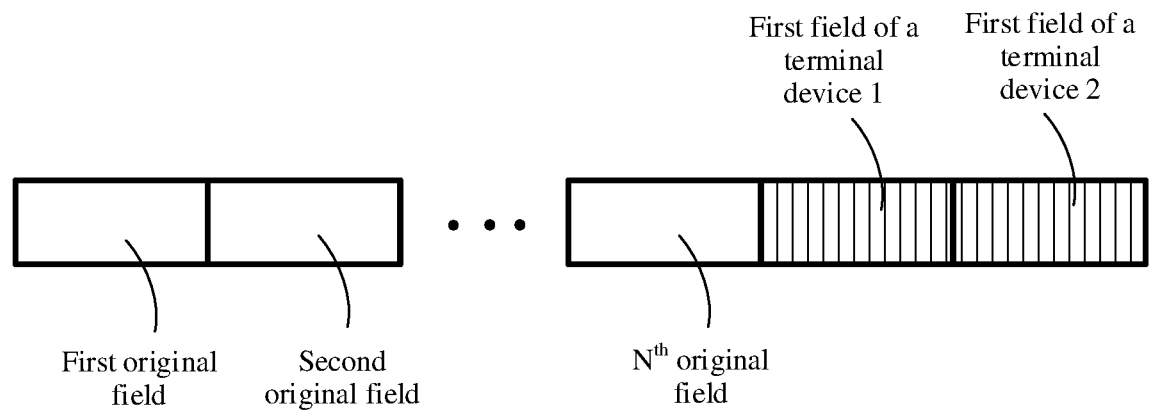
FIG. 6 is a schematic structural diagram of another first information according to an embodiment of this application.

Specifically, refer to first information shown in FIG. 6. In FIG. 6, two first fields are added to the existing DCI information. A first field of a terminal device 1 is used to indicate energy saving state information of the terminal device 1, and a first field of a terminal device 2 is used to indicate energy saving state information of the terminal device 2.

It should be noted that, when first fields of a plurality of different terminal devices are configured in one piece of first information, energy saving states of the terminal devices that are indicated by the fields may be the same or may be different. FIG. 6 is still used as an example. The first field of the terminal device 1 may be configured as information that indicates the terminal 1 to go to sleep, and the first field of the terminal device 2 may be configured as information that indicates the terminal 2 to wake up.

In addition, in a feasible implementation scenario, one first field may alternatively include a plurality of pieces of energy saving state information, and each piece of energy saving state information may include information that indicates one terminal device in the group to go to sleep or wake up.

Certainly, all other existing DCI formats may also be used as the first information, for example, a DCI format 0-0, a DCI format 0-1, a DCI format 1-0, a DCI format 1-1, a DCI format 2-0, a DCI format 2-1, and a DCI format 2-3. For example, when the first information is in the DCI format 1-0, a first field may be added to the DCI format 1-0, and the first field includes the information used to indicate the terminal device to go to sleep or wake up.

Optionally, when a first field is added to an existing DCI format, if the field includes the information that indicates the terminal device to go to sleep, the terminal device may ignore an original field in the DCI format, and may directly start to enter a sleep state in a slot slot or a subframe in which the DCI is located, instead of performing related scheduling based on the original field.

In another optional implementation scenario, when a first field is added to an existing DCI format, if the field includes the information that indicates the terminal device to go to sleep, the terminal device reads an original field in the DCI format, performs related scheduling based on the original field, and enters a sleep state after completing the related scheduling. Because current-slot slot scheduling and cross-slot scheduling exist, an effective time of the first field may be a next slot of a slot slot in which the DCI is located, or may be a plurality of slots following a slot slot in which the DCI is located. After completing the related scheduling, the terminal enters a sleep state.

In another optional implementation scenario, when a first field is added to an existing DCI format, if the field includes the information that indicates the terminal device to wake up, the terminal device performs related scheduling based on an original field, and directly starts to enter a wake-up state in a slot slot or a subframe in which the DCI is located. Because current-slot slot scheduling and cross-slot scheduling exist, an effective time of the first field may be the slot slot in which the DCI is located, or may be one or more slots following the slot slot in which the DCI is located. The terminal enters a wake-up state.

When the first information is configured in a configuration manner of adding a new field, all or some bits of the newly added field may be used to indicate the energy saving state information of the terminal device, and/or all or some values of the newly added field are used to indicate the energy saving state information of the terminal device. For an implementation thereof, refer to the first implementation.

In this configuration manner of adding a new field, existing DCI is lengthened, and the energy saving state information of the terminal device is indicated by using the newly added field. In addition, because no multiplexing or other processing is performed on an original field in the existing DCI, no function limitation is imposed on the original field in the existing DCI.

In a third manner, an original field in existing information is multiplexed to obtain the first information.

A principle of this implementation is as follows: Without changing a field length of existing DCI, an entire field or a part of the filed that can be multiplexed in the DCI is multiplexed into the first field, and the energy saving state information is set in the first field. In this way, when the first field occupies only a part of an original field, the part of the original field multiplexed into the first field may be located at a start location of the original field, any location in the middle of the original field, or an end location of the original field.

Figure 7:
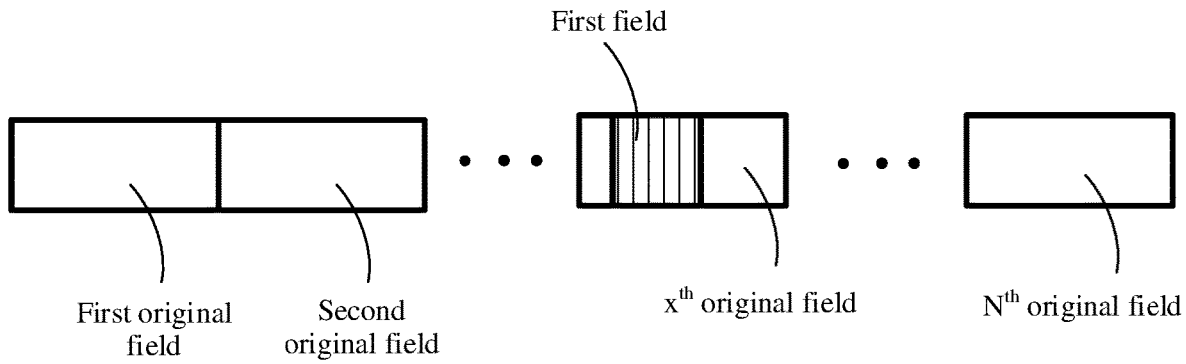
FIG. 7 is a schematic structural diagram of another first information according to an embodiment of this application.

Referring to FIG. 7, the first field includes N original fields in total, where N is an integer greater than or equal to 1. A part that is of an $x^{th}$ original field and that is located in the middle of the $x^{th}$ original field is multiplexed into the first field. In this way, the information indicating the energy saving state of the terminal device needs to be configured in the part that is of the field and that is multiplexed, where x is an integer ranging from 1 to N.

A field that can be multiplexed may be selected and configured as required. In a preferred implementation process, the first field may be but is not limited to a frequency domain resource allocation field in the first information.

For example, a frequency domain resource assignment field in existing DCI for a DCI format of a single terminal device such as a DCI format 0-0, a DCI format 0-1, a DCI format 1-1, or a DCI format 0-1 is used to indicate downlink/uplink data frequency resource allocation in the existing DCI. Therefore, a part of the field may be multiplexed into the first field to carry the energy saving state information.

For example, 1-bit information in the frequency domain resource allocation field is used to indicate the energy saving state information of the terminal, where "0" is used to indicate the terminal device to go to sleep, and "1" is used to indicate the terminal device to wake up. Other bit information is still used to indicate frequency resource allocation.

Optionally, when the first field is obtained by multiplexing an existing field in a DCI format, and energy saving state information of the field indicates the terminal device to go to sleep, the terminal device ignores another field in the DCI format other than the first field, and directly starts to enter a sleep state in a slot slot or a subframe in which the DCI is located, instead of performing related scheduling based on another field. When only a part of the existing field is multiplexed into the first field, a meaning of the other part of the existing fields may be ignored.

In another optional implementation scenario, when the first field is obtained by multiplexing an existing field in a DCI format, and energy saving state information of the field indicates the terminal device to go to sleep, the terminal device reads the original field in the DCI format, performs related scheduling based on the original field, and enters a sleep state after completing the related scheduling. Because current-slot slot scheduling and cross-slot scheduling exist, an effective time of the first field may be a next slot of a slot slot in which the DCI is located, or may be a plurality of slots following a slot slot in which the DCI is located. After completing the related scheduling, the terminal enters a sleep state.

In another optional implementation scenario, when the first field is obtained by multiplexing an existing field in a DCI format, and the field includes information that indicates the terminal device to wake up, the terminal device reads the original field in the DCI format, performs related scheduling based on the original field, and directly starts to enter a wake-up state in a slot slot or a subframe in which the DCI is located. Because current-slot slot scheduling and cross-slot scheduling exist, an effective time of the first field may be the slot slot in which the DCI is located, or may be one or more slots following the slot slot in which the DCI is located. The terminal enters a wake-up state.

Optionally, the multiplexed field may alternatively be another field in the existing DCI format, for example, a bandwidth part indicator (BWP indicator) field, a sounding reference signal request (SRS request) field, a transmit power control command for a preset physical uplink shared channel (TPC command for scheduled PUSCH) field, an antenna port(s) field, a synchronization signal/broadcast channel indicator (SS/PBCH index) field, a short message field, a modulation and coding scheme (MCS) field, a downlink assignment index (DAI) field, a transmitted precoding matrix indicator (TPMI) acknowledgment field, a precoding matrix indicator (PMI) acknowledgment field, a downlink power compensation (Downlink power offset) field, a hybrid automatic repeat request (HARQ) process number field, a transport block to codeword swap flag field, a precoding information field, a transmit power control (TPC) field, a scrambling identity field, an antenna port(s), scrambling identity and number of layers field, a physical downlink shared channel resource element mapping and quasi-co-location indicator field, a demodulation reference signal phase rotation and OCC index (Cyclic shift for Demodulation Reference Signal and Orthogonal Cover Code index) field, an uplink index (ULI) field, a downlink assignment index (DAI) field, a channel state information request field, or another field.

Similar to the foregoing two configuration manners, all or some bits of the first field may be used to indicate the energy saving state information of the terminal device, and/or all or some values of the first field are used to indicate the energy saving state information of the terminal device.

For an implementation thereof, refer to the first implementation.

This configuration manner of multiplexing a field does not affect a field length of DCI, and does not affect a quantity of blind PDCCH detections performed by the terminal device. In other words, a workload and energy consumption of performing blind PDCCH detection by the terminal device are not increased. However, because an original field is multiplexed into the first field, some functions of the original field may be limited.

In the foregoing three implementations, only an example in which the first information is DCI is used for description. During specific implementation, the first information may alternatively be information in another form.

A second aspect is configuring the second field.

The network device may determine content of the second field based on a specific time period in which the network device sends data to the terminal device and a specific time period in which the network device stops sending data to the terminal device. In other words, the network device may set the time period in which the network device sends data to the terminal device to duration in which the terminal device maintains a wake-up state, and set the time period in which the network device stops sending data to the terminal device to duration in which the terminal device maintains a sleep state. Correspondingly, if the first information received by the terminal device includes the second field, the terminal device only needs to maintain a sleep state or a wake-up state in a specific time period based on the indication of the second field.

It should be noted that the energy saving state in the second field is indicated in a plurality of manners, including but not limited to indication by using the first field. For example, the energy saving state maintained in the second field may be a current state of the terminal device, or may be indicated by sending indication information to the terminal device, or may be indicated by using a preset rule. This embodiment of this application imposes no limitation thereto.

A manner of representing the second field is not particularly limited in this embodiment of this application. For example, bit information may be used to indicate the duration of the energy saving state of the terminal device. For example, 2-bit information is used to indicate the energy saving state information. For example, "00", "01", "10", and "11" are used to indicate different time length information. Different bit information may be used to indicate one or more symbols, one or more slots, one or more subframes, one or more radio frames, one or more pieces of on duration on duration, one or more DRX cycles, one or more downlink control channel monitoring occasions (PDCCH monitoring occasion), and the like. In addition, in the 2-bit information, a specific bit such as "00" may be used to indicate other information, for example, to indicate whether a field in which the bit information is located or another field is meaningful, or to indicate that the field retains an original meaning. If a unit of the time length has been determined, bit information of different lengths is directly used to indicate specific lengths. For example, the second field is used to indicate the terminal device to maintain the energy saving state within one or more pieces of on duration on duration. Therefore, "01" is used to indicate that the terminal device maintains the energy saving state within next one piece of on duration on duration, "10" is used to indicate that the terminal device maintains the energy saving state within next two pieces of on duration on duration, and "11" is used to indicate that the terminal device maintains the energy saving state within next three pieces of on duration on duration.

In this embodiment of this application, the content of the second field may include but is not limited to the following configuration manners:

using all or some bits of the second field to indicate the information about the time length in which the terminal device maintains the energy saving state; and/or
using all or some values of the second field to indicate the information about the time length in which the terminal device maintains the energy saving state.

When a part of the second field is used to indicate the information about the time length in which the terminal device maintains the energy saving state, other bits of the second field may be used to carry other information, or other bits of the second field may be empty, in other words, do not carry information.

In addition, when some values of the second field are used to indicate the information about the time length in which the terminal device maintains the energy saving state, other values of the second field may be used to carry other information.

Therefore, this embodiment of this application provides a feasible solution for a combination of the foregoing two configuration manners.

For example, all bits and all data of the second field are used to indicate the information about the time length in which the terminal device maintains the energy saving state.

Alternatively, for another example, some bits and all values of the second field are used to indicate the information about the time length in which the terminal device maintains the energy saving state. In this case, other bits of the second field have no data.

In this embodiment of this application, the time length information in the second field is used to represent the time length, and may have a plurality of representation forms. In a specific implementation scenario, the time length information may be represented in the following manners:
one or more slots; or
one or more subframes; or
one or more pieces of on duration on duration; or
one or more physical downlink control channel monitoring occasions PDCCH monitoring occasion.

Specifically, the time length information may be represented in at least one of the following manners: a symbol, a slot, a subframe, a radio frame, on duration related to discontinuous transmission, and a DRX cycle. In addition, the time length information may alternatively be represented by using a downlink control channel monitoring occasion (PDCCH monitoring occasion).

When the second field indicates one or more symbols (or slots, or subframes, or radio frames), an effective location of the field may start from a symbol (or a slot, or a subframe, or a radio frame) in which the second field is located, or may start from one or more symbols (or slots, or subframes, or radio frames) following a symbol (or a slot, or a subframe, or a radio frame) in which the second field is located.

When the second field indicates one or more pieces of on duration (or DRX cycles), the effective location of the field may be on duration (or a DRX cycle) in which the second field is located, or may be one or more pieces of on duration (or DRX cycles) following on duration (or a DRX cycle) in which the second field is located.

When the second field may indicate one or more PDCCH monitoring occasions, the field is used to indicate the terminal to maintain a corresponding energy saving state in the one or more PDCCH monitoring occasions. The second field may indicate the terminal device to maintain the energy saving state in one or more PDCCH monitoring occasions starting from a current PDCCH monitoring occasion, or indicate the terminal device to maintain the corresponding energy saving state in one or more PDCCH monitoring occasions starting from a next PDCCH monitoring occasion.

Therefore, if the energy saving state is a sleep state, the terminal device skips the one or more PDCCH monitoring occasions indicated by the second field. To be specific, the terminal device is indicated not to perform PDCCH detection within the one or more PDCCH monitoring occasions and not to perform data scheduling; or the terminal is indicated to perform data scheduling after the one or more PDCCH monitoring occasions, and the terminal device starts to monitor a PDCCH after the one or more PDCCH monitoring occasions.

The PDCCH monitoring occasion is obtained based on a configuration of the base station. Usually, the network device configures one or more search spaces for the terminal device, and the terminal device determines the PDCCH monitoring occasion based on a configuration status of the search space.

For example, it is assumed that the network device configures a search space 0 for the terminal device, and a monitoring period of the search space 0 is two slots. Therefore, when the second field indicates two PDCCH monitoring occasions, optionally, the terminal device is in a corresponding energy saving state in two PDCCH monitoring occasions starting from a current PDCCH monitoring occasion, or the terminal device is in a corresponding energy saving state in two PDCCH monitoring occasions starting from a next PDCCH monitoring occasion of a current PDCCH monitoring occasion.

Figure 8:
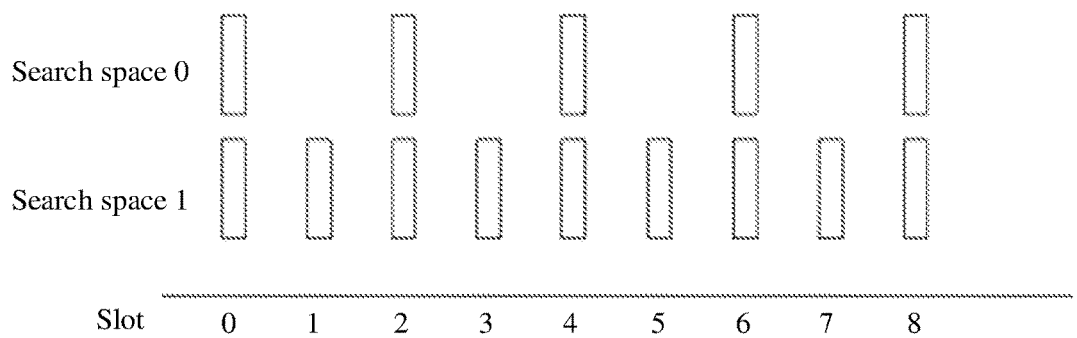
FIG. 8 is a schematic diagram of a configuration rule of a search space according to an embodiment of this application.

Alternatively, for another example, the network device configures a search space 0 and a search space 1 for the terminal device, a monitoring period of the search space 0 is two slots, and a monitoring period of the search space 1 is one slot, which is shown in FIG. 8. In this case, for the terminal device, there may be the following several manners for the PDCCH monitoring occasion:

In a first processing manner, the PDCCH monitoring occasion means PDCCH monitoring occasion of all search spaces. In this case, the terminal device needs to monitor the search space 0 and the search space 1 in each of a slot 0 to a slot 9. Therefore, each of the slot 0 to the slot 9 includes one PDCCH monitoring occasion.

Optionally, if the second field indicates the terminal device to maintain a corresponding energy saving state in subsequent two PDCCH monitoring occasions, it is equivalent to indicating the terminal device to maintain the corresponding energy saving state in a total of three slots including a current slot.

Optionally, if the second field indicates the terminal device to maintain a corresponding energy saving state in two PDCCH monitoring occasions starting from a current PDCCH monitoring occasion, it is equivalent to indicating the terminal device to maintain the corresponding energy saving state in a total of two slots including a current slot.

In a second processing manner, the PDCCH monitoring occasion means a PDCCH monitoring occasion of a specific search space.

For a PDCCH monitoring occasion of the search space 0, there is one PDCCH monitoring occasion in every two slots.

Optionally, if the second field indicates the terminal device to maintain a corresponding energy saving state in subsequent two PDCCH monitoring occasions, it is equivalent to indicating the terminal device to maintain the corresponding energy saving state in six slots.

Optionally, if the second field indicates the terminal device to maintain a corresponding energy saving state in two PDCCH monitoring occasions starting from a current PDCCH monitoring occasion, it is equivalent to indicating the terminal device to maintain the corresponding energy saving state in four slots.

Similarly, for a PDCCH monitoring occasion of the search space 1, there is one PDCCH monitoring occasion in each slot.

Optionally, if the second field indicates the terminal device to maintain a corresponding energy saving state in subsequent two PDCCH monitoring occasions, it is equivalent to indicating the terminal device to maintain the corresponding energy saving state in three slots.

Optionally, if the second field indicates the terminal device to maintain a corresponding energy saving state in two PDCCH monitoring occasions starting from a current PDCCH monitoring occasion, it is equivalent to indicating the terminal device to maintain the corresponding energy saving state in two slots.

It can be understood that, in the foregoing two processing manners, if a same PDCCH monitoring occasion may be obtained based on configurations of the two search spaces, results of the two methods are the same.

In addition, there may be another setting manner, for example, a manner of a smaller time granularity TS. No enumeration is listed herein.

In addition to the configuration for the manner of representing the time length information, a start moment of the time period further needs to be configured in the time length information. The start moment may be directly configured as a specific moment, or may be configured in a preset manner.

For example, a moment at which the terminal device receives the first information may be used as the start moment.

For another example, a start moment of a next one or more slots (or subframes) after the terminal device receives the first information may be used as the start moment of the time period.

In addition to the foregoing configuration manner for specific content in each second time period, the configuration manner of the second field is similar to that of the first field, but the second field and the first field carry different information. Therefore, there may be at least the following three configuration manners:

In a first manner, new first information used to indicate the energy saving state of the terminal device is designed.

In this implementation, a field quantity, a field location, and a definition of each field of the first information may be configured as required. Essentially, a new information format is designed.

Figure 9:
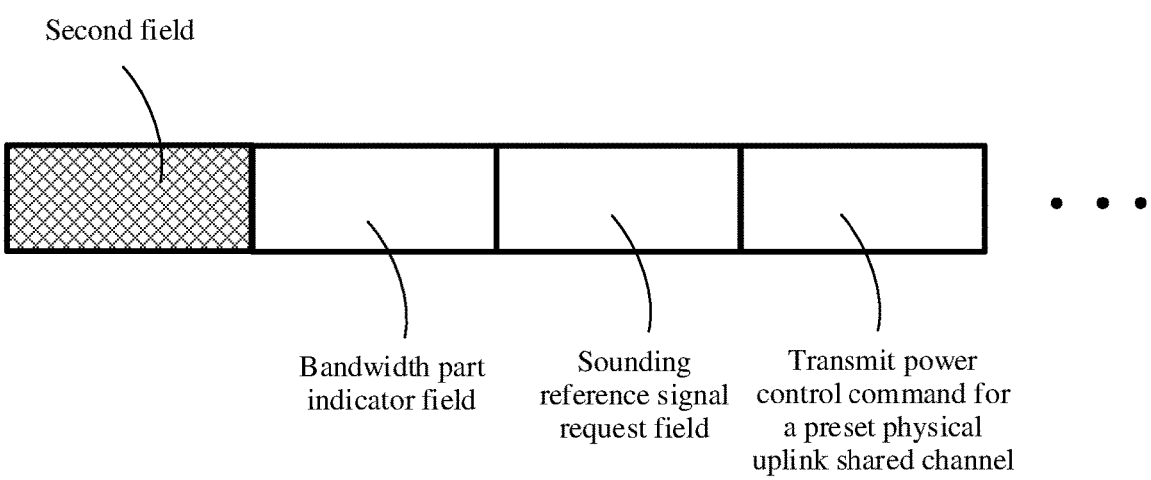
FIG. 9 is a schematic structural diagram of another first information according to an embodiment of this application.

An example in which the first information is DCI is still used. Referring to FIG. 9, the 1$^{st}$ field in the first information includes the information indicating the time length in which the terminal device maintains the energy saving state, which is the second field.

In addition, in a feasible implementation, the first information may be downlink control information (DCI). In this case, if the first information is in a newly designed DCI format, the first information may further include other fields, and these fields may be defined as required. Therefore, in a specific implementation scenario, the first information may further include one or more of the following fields:
a bandwidth part indicator (BWP indicator) field, a sounding reference signal request (SRS request) field, a transmit power control command for a preset physical uplink shared channel (TPC command for scheduled PUSCH) field, and an antenna port(s) field.

When the energy saving state that needs to be maintained and that corresponds to the second field is a wake-up state, the bandwidth part indicator field is used to indicate a BWP of downlink data that the terminal device needs to receive subsequently, and the terminal device may correspondingly receive the downlink data at the BWP; the SRS request field is used to indicate the terminal device to perform aperiodic SRS sending; and the TPC command for scheduled PUSCH field is used to indicate a power adjustment value for scheduling uplink data sending.

In an optional implementation scenario, the first information may be configured in a manner shown in FIG. 9. To be specific, in addition to the second field, the first information further includes the foregoing fields.

It should be noted that a configuration location of each field in the first information may be set as required. For example, the second field may be configured in any field in the first information. Specifically, as shown in FIG. 9, the second field may be configured in an initial field of the first information, or the second field may be configured at any location in the middle of the first information, or the second field may be configured at an end location of the first information.

In the configuration manner shown in FIG. 9, the second field is configured in the initial field of the first information. This can help the terminal device quickly determine, after receiving the first information, the time period in which the terminal device needs to maintain the energy saving state. Therefore, when the terminal device specifically maintains the energy saving state, the terminal device may read or abandon reading information carried in another field of the first information, thereby further reducing energy consumption.

The foregoing fields are merely preferred fields. During actual implementation of this solution, the first information may further include another field.

Optionally, the first information may further include one or more of the following fields: a bandwidth part indicator (BWP indicator) field, a sounding reference signal request (SRS request) field, a transmit power control command for a preset physical uplink shared channel (TPC command for scheduled PUSCH) field, an antenna port(s) field, a synchronization signal/broadcast channel indicator (SS/PBCH index) field, a short message field, a modulation and coding scheme (MCS) field, a downlink assignment index (DAI) field, a transmitted precoding matrix indicator (TPMI) acknowledgment field, a precoding matrix indicator (PMI) acknowledgment field, a downlink power compensation (Downlink power offset) field, a hybrid automatic repeat request (HARQ) process number field, a transport block to codeword swap flag field, a precoding information field, a transmit power control (TPC) field, a scrambling identity field, an antenna port(s), scrambling identity and number of layers field, a physical downlink shared channel resource element mapping and quasi-co-location indicator field, a demodulation reference signal phase rotation and OCC index (Cyclic shift for Demodulation Reference Signal and Orthogonal Cover Code index) field, an uplink index (ULI) field, a downlink assignment index (DAI) field, a channel state information request field, and the like.

In this implementation, a meaning of each field in the first information may be defined as required. Compared with an existing DCI format, the first information defined in this manner can reduce fields included in the DCI format to some extent, so that the terminal device enables a minimum quantity of functions, thereby achieving energy saving. In addition, a user-defined manner is relatively flexible.

In a second manner, a new field is added to existing information to obtain the first information.

Figure 10:
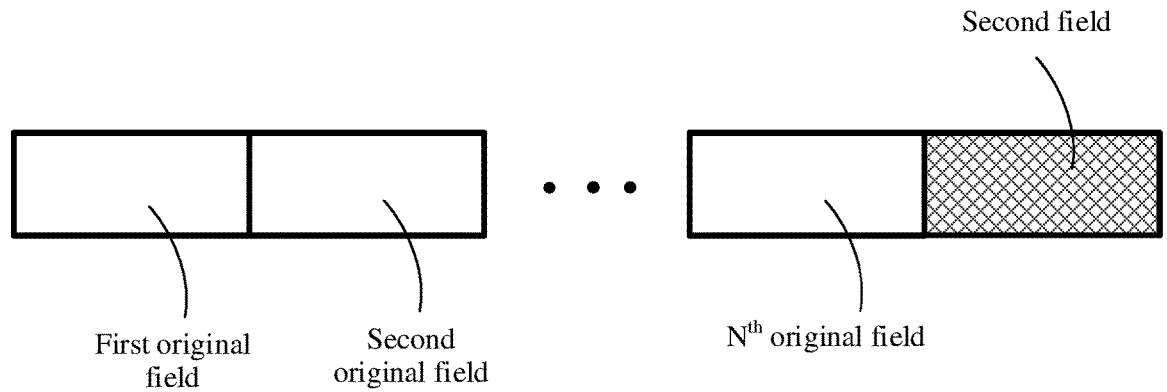
FIG. 10 is a schematic structural diagram of another first information according to an embodiment of this application.

For ease of understanding, refer to a schematic structural diagram of first information shown in FIG. 10. The first information includes (N+1) fields in total, where N is an integer greater than or equal to 1. The first N fields in the first information are all fields in existing DCI, and an $(N+1)^{th}$ field is the second field described in this application. The field is a newly added field in the existing DCI, and specifically includes the information indicating the time length in which the terminal device maintains the energy saving state.

In addition, it should be further noted that a location of the newly added field is not particularly limited in this embodiment of this application. As shown in FIG. 10, a manner of configuring the newly added second field at an end location of the existing DCI is merely a feasible implementation. In addition, the newly added second field may be further configured at a start location of the existing DCI, or the newly added field may be configured at any location in the middle of the existing DCI.

An existing DCI format includes a DCI format for a group, for example, a DCI format 2-2. A field length of the DCI format is variable, a base station configures different format lengths for different quantities of terminals in the group, and information in the DCI format may be used to simultaneously indicate a plurality of terminals. Therefore, in a preferred implementation process, if the second field is a newly added field in the first information, the first information may be but is not limited to the DCI format 2-2. When the first information is in the DCI format 2-2, a plurality of second fields may be added to indicate time length information of different terminals in the group.

Figure 11:
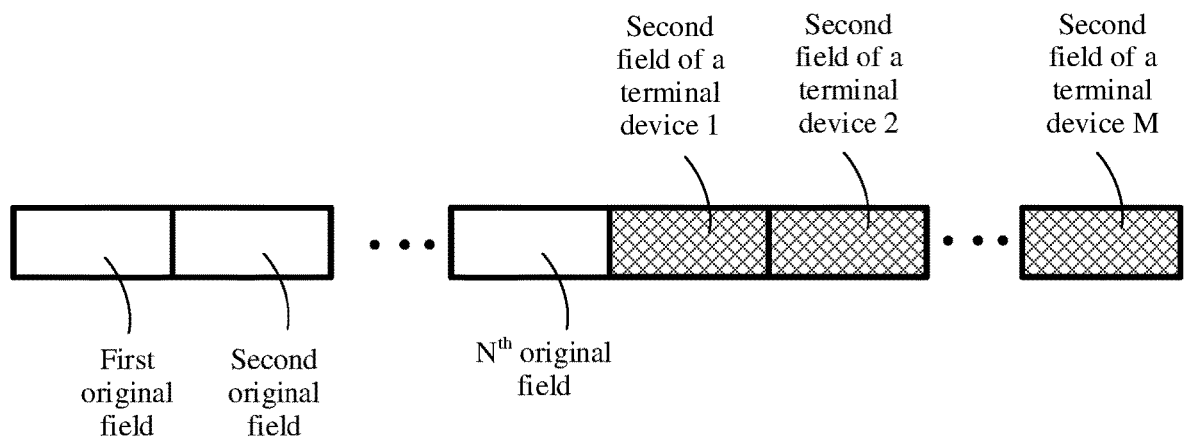
FIG. 11 is a schematic structural diagram of another first information according to an embodiment of this application.

Specifically, refer to first information shown in FIG. 11. In FIG. 11, M second fields are added to the existing DCI information. A second field of a terminal device 1 is used to indicate information about a time length in which the terminal device 1 maintains an energy saving state 1, and a second field of a terminal device 2 is used to indicate information about a time length in which the terminal device 2 maintains an energy saving state 2. By analogy, a second field of a terminal device M is used to indicate information about a time length in which the terminal device M maintains an energy saving state M, where M is an integer greater than 1.

It should be noted that, when second fields of a plurality of different terminal devices are configured in one piece of first information, energy saving states of the terminal devices that are indicated by the fields may be the same or may be different, and time lengths of the terminal devices that are indicated by the fields may be the same or may be different. The terminal device 1 and the terminal device 2 in FIG. 11 are still used as an example. The second field of the terminal device 1 may be configured to indicate a time period 1 in which the terminal 1 maintains a sleep state, and the second field of the terminal device 2 may be configured to indicate a time period 2 in which the terminal 2 maintains a wake-up state.

In addition, in a feasible implementation scenario, one second field may alternatively include a plurality of pieces of energy saving state information, and each piece of energy saving state information may indicate information about a time length in which one terminal device in the group maintains an energy saving state.

Certainly, all other existing DCI formats may also be used as the first information, for example, a DCI format 0-0, a DCI format 0-1, a DCI format 1-0, a DCI format 1-1, a DCI format 2-0, a DCI format 2-1, and a DCI format 2-3. For example, when the first information is in the DCI format 1-0, a second field may be added to the DCI format 1-0, and the second field includes the information indicating the time length in which the terminal device maintains the energy saving state.

Optionally, when a second field is added to an existing DCI format, if the field includes information indicating a time length in which the terminal device maintains a sleep state, the terminal device may ignore an original field in the DCI format in a time period corresponding to the time length, and may directly enter a sleep state at a start moment of the time period instead of performing related scheduling based on the original field. When the first information is configured in a configuration manner of adding a new field, all or some bits of the newly added field may be used to indicate the energy saving state information of the terminal device, and/or all or some values of the newly added field are used to indicate the energy saving state information of the terminal device. For an implementation thereof, refer to the first implementation.

In this configuration manner of adding a new field, existing DCI is lengthened, and the energy saving state information of the terminal device is indicated by using the newly added field.

In addition, because no multiplexing or other processing is performed on an original field in the existing DCI, no function limitation is imposed on the original field in the existing DCI.

In a third manner, an original field in existing information is multiplexed to obtain the first information.

A principle of this implementation is as follows: Without changing a field length of existing DCI, an entire field or a part of the filed that can be multiplexed in the DCI is multiplexed into the second field, and the energy saving state information is set in the second field. In this way, when the second field occupies only a part of an original field, the part of the original field multiplexed into the second field may be located at a start location of the original field, any location in the middle of the original field, or an end location of the original field.

Figure 12:
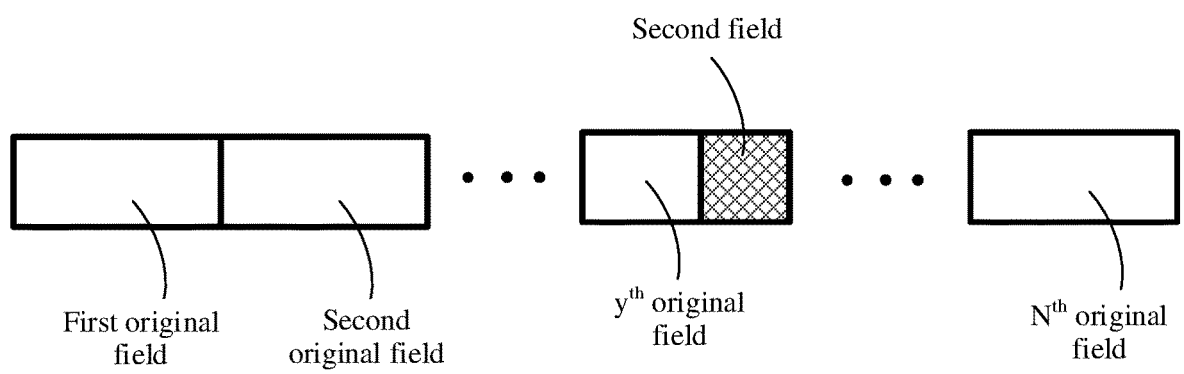
FIG. 12 is a schematic structural diagram of another first information according to an embodiment of this application.

Referring to FIG. 12, the second field includes N original fields in total, where N is an integer greater than or equal to 1. A part that is of a $y^{th}$ original field and that is located at an end location of the $y^{th}$ original field is multiplexed into the second field. In this way, the information indicating the time length in which the terminal device maintains the energy saving state needs to be configured in the part that is of the field and that is multiplexed, where y is an integer ranging from 1 to N.

A field that can be multiplexed may be selected and configured as required. In a preferred implementation process, the second field may be but is not limited to a frequency domain resource allocation field in the first information.

For example, a frequency domain resource assignment field in existing DCI for a DCI format of a single terminal device such as a DCI format 0-0, a DCI format 0-1, a DCI format 1-1, or a DCI format 0-1 is used to indicate downlink/ uplink data frequency resource allocation in the existing DCI. Therefore, a part of the field may be multiplexed into the second field to carry the energy saving state information.

Optionally, when the second field is added to the existing DCI format, if the field includes information indicating a time length in which the terminal device maintains a sleep state, the terminal device may ignore an original field in the DCI format in a time period corresponding to the time length, and may enter a sleep state at a start moment of the time period instead of performing related scheduling based on the original field.

Optionally, the multiplexed field may alternatively be another field in the existing DCI format, for example, a bandwidth part indicator (BWP indicator) field, a sounding reference signal request (SRS request) field, a transmit power control command for a preset physical uplink shared channel (TPC command for scheduled PUSCH) field, an antenna port(s) field, a synchronization signal/broadcast channel indicator (SS/PBCH index) field, a short message field, a modulation and coding scheme (MCS) field, a downlink assignment index (DAI) field, a transmitted precoding matrix indicator (TPMI) acknowledgment field, a precoding matrix indicator (PMI) acknowledgment field, a downlink power compensation (Downlink power offset) field, a hybrid automatic repeat request (HARQ) process number field, a transport block to codeword swap flag field, a precoding information field, a transmit power control (TPC) field, a scrambling identity field, an antenna port(s), scrambling identity and number of layers field, a physical downlink shared channel resource element mapping and quasi-co-location indicator field, a demodulation reference signal phase rotation and OCC index (Cyclic shift for Demodulation Reference Signal and Orthogonal Cover Code index) field, an uplink index (ULI) field, a downlink assignment index (DAI) field, or a channel state information request field.

A third aspect is configuring both the first field and the second field in the first information.

First, it should be noted that the first field and the second field may be a same field, or may be different fields.

Figure 13:
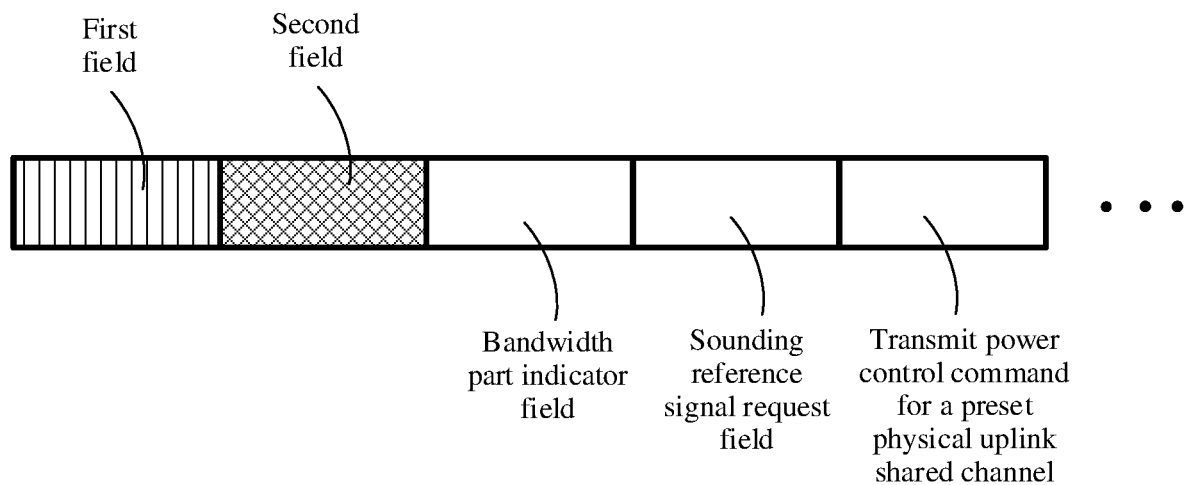
FIG. 13 is a schematic structural diagram of another first information according to an embodiment of this application.

For example, referring to first information shown in FIG. 13, the first information is configured in a manner of designing a new information format, and the first information includes a first field, a second field, a BWP indicator field, an SRS request field, a TPC command for scheduled PUSCH field, and another field (which is represented by an ellipsis). The first field and the second field occupy locations of two fields in the first information.

Figure 14:
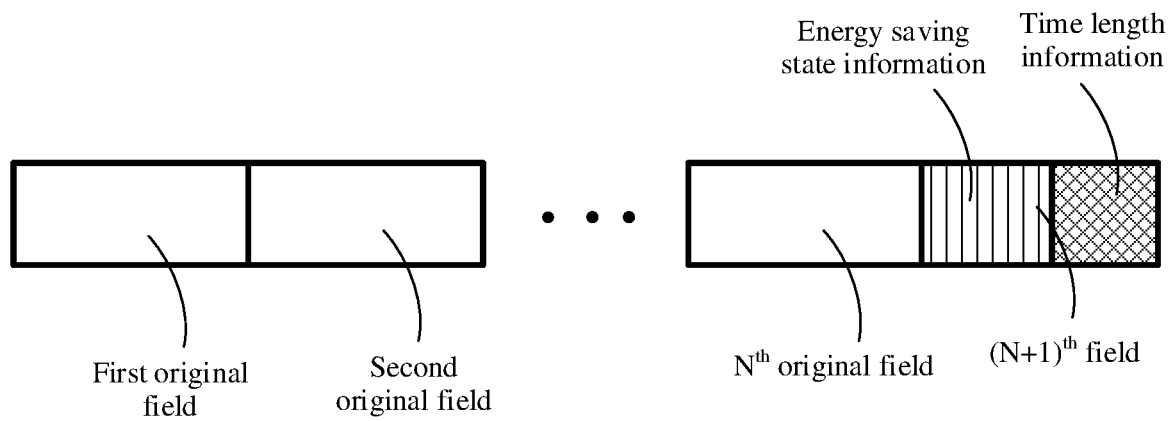
FIG. 14 is a schematic structural diagram of another first information according to an embodiment of this application.

For another example, referring to first information shown in FIG. 14, the first information is configured by adding a field to an original field of existing information, and includes N+1 fields in total. In addition to N original fields, the first field and the second field jointly occupy a location of an $(N+1)^{th}$ field.

In addition, the first field and the second field may be configured in a same configuration manner, or may be configured in different configuration manners.

Figure 15:
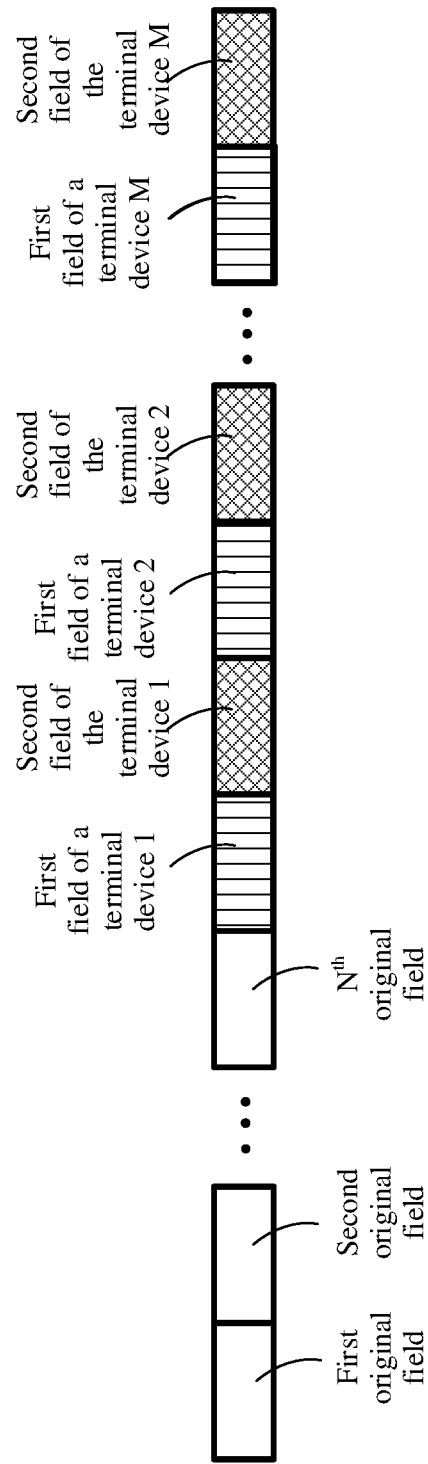
FIG. 15 is a schematic structural diagram of another first information according to an embodiment of this application.

For example, first information shown in FIG. 15 includes (N+2M) fields in total. In addition to N original fields, the first information further includes first fields and second fields of M terminal devices. In this case, each first field and each second field are configured in a same manner, and are obtained in a manner of adding a field to an original field in existing information.

Figure 16:
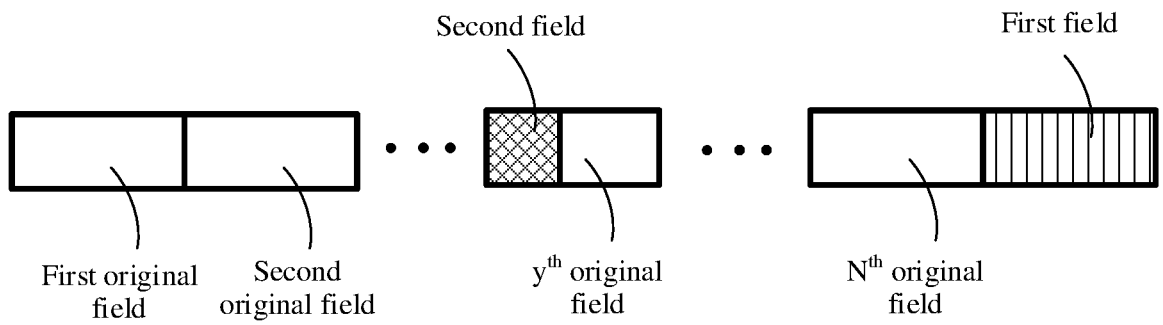
FIG. 16 is a schematic structural diagram of another first information according to an embodiment of this application.

Alternatively, for another example, first information shown in FIG. 16 includes (N+1) fields in total, N fields are original fields in existing DCI, and an $(N+1)^{th}$ field is a newly added field. In addition, the newly added field is the first field, and a part of a $y^{th}$ field in the original fields is multiplexed into the second field, where y is an integer ranging from 1 to N. In this case, the first field is the newly added field in the existing DCI, and the second field is obtained by multiplexing the part of the original field. The two configuration manners are different.

In addition, when one piece of first information carries first fields and second fields of a plurality of terminal devices, in a preferred case, as shown in FIG. 15, M first fields are in a one-to-one correspondence with M second fields, and quantities of the M first fields and the M second fields are equal.

In an extreme case, the first field and the second field may be set only for some terminal devices, and the first field is set only for the other terminal devices, or the second field is set only for the other terminals, which may be used in combination.

In the foregoing manner, the network device may complete configuration of the first information, and then the network device sends the first information to the terminal device.

The following describes an information receiving method from the perspective of a terminal.

After receiving the first information, the terminal device may obtain different information based on different configuration manners of the first information, including at least one of the energy saving state information and the time length information. Therefore, when the terminal device adjusts the energy saving state of the terminal device, there may be at least the following cases:

In a first case, the terminal device obtains the energy saving state information and the time length information based on the first information.

In this case, in the time period indicated by the time length information, the terminal adjusts the energy saving state of the terminal and maintains a sleep state or a wake-up state indicated by the energy saving state information.

In a second case, the terminal device obtains the energy saving state information only based on the first information.

Optionally, the terminal device may directly adjust the energy saving state of the terminal device and maintain a sleep state or a wake-up state indicated by the energy saving state information.

Optionally, based on a preset time period: next one or more slots (or subframes, or on duration, or PDCCH monitoring occasions) of the first information, the terminal device adjusts the energy saving state of the terminal device and maintains a sleep state or a wake-up state indicated by the energy saving state information.

Optionally, the network device may send indication information including the second field to the terminal device. Correspondingly, the terminal device receives and reads the indication information, to obtain a target time period indicated by the second field. Therefore, in the target time period, the terminal device adjusts the energy saving state of the terminal device and maintains a sleep state or a wake-up state indicated by the energy saving state information.

Optionally, the network device may send configuration manner information of the first information to the terminal device, and the terminal device reads the first information based on the configuration manner information, to obtain the energy saving state information and a target time period corresponding to the energy saving state. The configuration manner information is used to indicate a meaning of each field in the first information, or preset duration corresponding to each first field, or preset duration corresponding to each energy saving state.

For example, if the first information includes only a plurality of first fields (referring to FIG. 6), and the configuration manner information of the first information indicates preset duration corresponding to each first field, the terminal device determines the preset duration corresponding to each first field as the target time period.

For another example, if the network device presets preset duration corresponding to a sleep state to one slot, and preset duration corresponding to a wake-up state to three slots, in addition to configuring only the first field in the first information and sending the first field to the terminal device, the network device further sends the configuration manner information including the correspondence to the terminal device. In this case, the terminal device may determine a specific period for maintaining the energy saving state.

The target time period may be obtained in any one of the foregoing implementations.

In a third case, the terminal device obtains, based on only the first information, the information about the time length for maintaining the energy saving state.

Optionally, the terminal device may set, by default, the energy saving state that needs to be maintained as a sleep state. In this case, only after the terminal device receives the first information, in other words, within the time period indicated by the second field, the terminal device adjusts the energy saving state of the terminal device and switches to a sleep state.

Optionally, the terminal device may set, by default, the energy saving state that needs to be maintained to be opposite to a current energy saving state. In this case, the terminal device only needs to determine a current energy saving state of the terminal device after receiving the first information. Therefore, within the time period indicated by the second field, the terminal device adjusts the energy saving state of the terminal device and switches to an energy saving state that is opposite to the current energy saving state.

Optionally, the network device may send indication information including the first field to the terminal device. Correspondingly, the terminal device receives and reads the indication information, to obtain the energy saving state indicated by the first field. Therefore, in the time period indicated by the second field, the terminal device adjusts the energy saving state of the terminal device and maintains a sleep state or a wake-up state indicated by the indication information.

For example, in a specific implementation scenario, the network device may send third information to the terminal device, and the third information is used to indicate that the terminal device is in a sleep state or a wake-up state. Correspondingly, the terminal device receives the third information sent by the network device, and obtains, based on the third information, the target state corresponding to the target time period.

Optionally, the network device may send the configuration manner information of the first information to the terminal device, and the terminal device reads the first information based on the configuration manner information, to obtain the energy saving state information and the target time period corresponding to the energy saving state. The configuration manner information is used to indicate a meaning of each field in the first information, or an energy saving state corresponding to each first field.

For example, the first information includes only a plurality of second fields (referring to FIG. 11), and the configuration manner information of the first information indicates an energy saving state corresponding to each second field. In this case, the terminal device determines, based on identification information of the terminal device, the second field corresponding to the terminal device, and further determines the energy saving state corresponding to the second field. Therefore, within the time period indicated by the second field, the terminal device adjusts the energy saving state of the terminal device and maintains a sleep state or a wake-up state corresponding to the second field.

The target time period may be obtained in any one of the foregoing implementations.

In this embodiment of this application, to further reduce energy consumption of the terminal device, classification may be performed based on whether the terminal device supports an energy saving working mode.

The energy saving working mode is a working mode in which the terminal device can support switching between a sleep state and a wake-up state. In addition, the terminal device can monitor and receive a PDCCH in a wake-up state, and cannot monitor or cannot receive a PDCCH in a sleep state, thereby reducing energy consumption.

A normal working mode is relative to the energy saving working mode. In the normal working mode, the terminal device performs blind PDCCH detection in a preset manner.

Based on this, during specific implementation, the terminal device may send capability information of the terminal device to the network device, so that the network device indicates, based on the capability information, whether the terminal device switches to the energy saving working mode. The capability information is used to indicate whether the terminal device has the energy saving working mode.

Therefore, correspondingly, the network device receives the capability information.

Therefore, to reduce energy consumption, the network device may send the first information to only a terminal device that supports the energy saving working mode, and does not send the first information to a terminal device that does not support the energy saving working mode. This reduces energy consumption caused by meaningless information receiving by this part of terminal devices.

In addition, the network device may further send second information to the terminal device that supports the energy saving working mode, and the second information may be used to indicate whether the terminal device switches to the energy saving working mode.

Correspondingly, the terminal device receives the second information sent by the network device.

Optionally, if the second information indicates the terminal device to switch a current working mode to the energy saving working mode, a working mode switching process is performed. It can be learned that, if the current working mode is the energy saving working mode, no switching processing needs to be performed.

Alternatively, the network device may receive only the capability information but not indicate to send the first information. In this case, the network device still sends the first information through group-sending or one-by-one sending in an original manner. In this process, whether the terminal device has the energy saving working mode is not considered.

In addition, in this embodiment of this application, it is considered that the terminal device needs specific duration to receive and demodulate the first information, in other words, needs offset duration offset. The offset duration is used to represent a time length between a receiving moment at which the terminal device receives the first information and a preset moment. The preset moment is the first slot or the first subframe in which the terminal device enters on duration on duration in a discontinuous reception (DRX) state.

In addition, it should be noted that a delay between the receiving moment at which the terminal device receives the first information and a sending moment at which the network device sends the first information is relatively small. In some application scenarios, the offset is used to represent a time length between the sending moment at which the network device sends the first information and the preset moment. In this case, this definition manner is also applicable to the foregoing solution provided in this application.

Therefore, the method may further include the following steps:

sending, by the terminal device, offset information to the network device, so that the network device configures the first information based on the offset information; and receiving, by the network device, the offset information.

After receiving the offset information, the network device may use the offset duration as a reference, to configure a specific value of the time length information included in the second field. During specific implementation, the target time period indicated by the time length information is greater than or equal to the offset duration.

Alternatively, similar to the second information, the network device may receive only the offset information, and is not configured to indicate to configure the time length information in the second field. In this case, the network device does not consider the offset information, and still configures the second field in an original manner.

The first information, the second information, the third information, the capability information, the offset information, and the like in this embodiment of this application may be carried in higher layer control signaling to implement sending and receiving. The higher layer control signaling may include but is not limited to at least one of radio resource control (RRC) signaling, media access control control element (MAC CE) signaling, and DCI signaling.

Optionally, the second information is at least one of an RRC message, a MAC CE message, and DCI.

Optionally, the third information is at least one of an RRC message, a MAC CE message, and DCI.

It can be understood that some or all of the steps in the foregoing embodiments are merely examples. In this embodiment of this application, other operations or variants of operations may be further performed. In addition, the steps may be performed in a sequence different from that presented in the foregoing embodiment, and possibly, not all operations in the foregoing embodiment need to be performed.

It can be understood that, in the foregoing embodiments, an operation or a step implemented by the terminal device may alternatively be implemented by a component (for example, a chip or a circuit) that can be used for the terminal device, an operation or a step implemented by a core network node may alternatively be implemented by a component (for example, a chip or a circuit) that can be used for the core network node, and an operation or a step implemented by the network device (for example, a first network device, a second network device, or a third network device) may alternatively be implemented by a component (for example, a chip or a circuit) that can be used for the network device.

Figure 17:
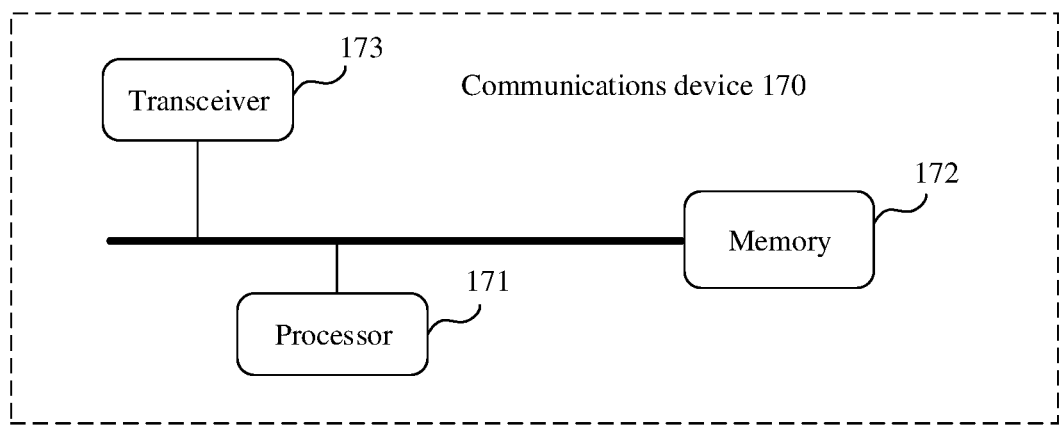
FIG. 17 is a schematic structural diagram of an entity of a communications device according to an embodiment of this application.

FIG. 17 is a schematic structural diagram of a communications device 170. The communications device may be configured to implement the method in the part corresponding to the network device or the method in the part corresponding to the terminal device described in the foregoing method embodiments. For details, refer to the descriptions in the foregoing method embodiments.

The communications device 170 may include one or more processors 171. The processor 171 may also be referred to as a processing unit, and may implement a specific control function. The processor 171 may be a general-purpose processor, a special-purpose processor, or the like.

In an optional design, the processor 171 may also store an instruction, and the instruction may be run by the processor 171, so that the communications device 170 is enabled to perform the method, described in the foregoing method embodiment, corresponding to the terminal device or the network device.

In another possible design, the communications device 170 may include a circuit, and the circuit may implement the transmission, reception, or communication function in the foregoing method embodiments.

Optionally, the communications device 170 may include one or more memories 172.

The memory 172 stores an instruction or intermediate data. The instruction may be run on the processor 171, so that the communications device 170 is enabled to perform the methods described in the foregoing embodiments. Optionally, the memory 172 may further store other related data. Optionally, the processor 171 may also store an instruction and/or data. The processor 171 and the memory 172 may be separately disposed, or may be integrated together.

Optionally, the communications device 170 may further include a transceiver 173.

The processor 171 may be referred to as a processing unit. The transceiver 173 may be referred to as a transceiver unit, a transceiver, a transceiver circuit, a transceiver, or the like, and is configured to implement sending and receiving functions of the communications device.

If the communications device is configured to implement an operation corresponding to a network device side in the embodiment shown in FIG. 3, for example, the transceiver 173 may send the first information and the second information to the terminal device, and the transceiver 173 receives the capability information and the offset information that are sent by the terminal device. The transceiver 173 may further complete another corresponding communication function. The processor 171 is configured to complete a corresponding determining or control operation. Optionally, a corresponding instruction may be further stored in the memory 172. For a specific processing manner of each component, refer to the related descriptions in the foregoing embodiments.

If the communications device is configured to implement an operation corresponding to a terminal device side in the embodiment shown in FIG. 3, for example, the transceiver 173 may receive the first information, the second information, and the third information that are sent by the network device, and the transceiver 173 sends the capability information and the offset information to the network device. The transceiver 173 may further complete another corresponding communication function. The processor 171 is configured to complete a corresponding determining or control operation. Optionally, a corresponding instruction may be further stored in the memory 172. For a specific processing manner of each component, refer to the related descriptions in the foregoing embodiments.

The processor and the transceiver described in this application may be implemented on an integrated circuit (IC), an analog IC, a radio frequency integrated circuit RFIC, a composite signal IC, an application-specific integrated circuit (ASIC), a printed circuit board (PCB), an electronic device, or the like. The processor and the transceiver may also be manufactured by using various 1C process technologies, for example, a complementary metal-oxide-semiconductor (CMOS), an N-channel metal oxide semiconductor (nMetal-oxide-semiconductor, NMOS), a p-channel metal oxide semiconductor (positive channel metal oxide semiconductor, PMOS), a bipolar junction transistor (BJT), a bipolar CMOS (BiCMOS), silicon germanium (SiGe), and gallium arsenide (GaAs).

Optionally, the communications device may be an independent device or may be a part of a relatively large device. For example, the device may be:

(1) an independent IC, a chip, or a chip system or subsystem;
(2) a set having one or more ICs, where optionally, the IC set may also include a storage component configured to store data and/or an instruction;
(3) an ASIC, for example, a modem (MSM);
(4) a module that can be embedded in another device;
(5) a receiver, a terminal device, a cellular phone, a wireless device, a handheld phone, a mobile unit, or a network device; or
(6) another device or the like.

Figure 18:
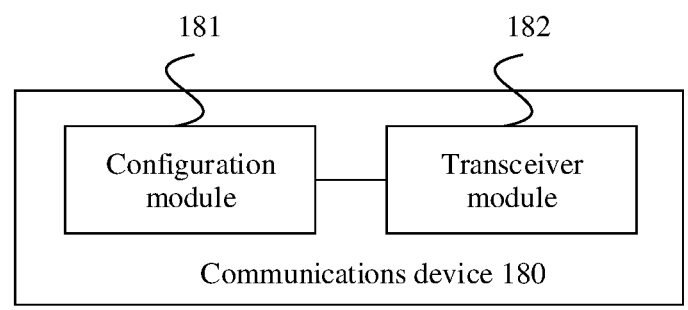
FIG. 18 is a function block diagram of a communications device according to an embodiment of this application.

FIG. 18 is a schematic structural diagram of a communications device according to an embodiment of this application. As shown in FIG. 18, the communications device 180 includes a configuration module 181 and a transceiver module 182. The configuration module 181 is configured to configure first information, where the first information includes a first field and/or a second field, the first field includes information indicating an energy saving state of a terminal device, and the second field includes information indicating a time length in which the terminal device maintains the energy saving state. The transceiver module 182 is configured to send the first information to the terminal device.

In FIG. 18, optionally, all or some bits of the first field are used to indicate the energy saving state information of the terminal device.

Optionally, all or some values of the first field are used to indicate the energy saving state information of the terminal device.

Optionally, the first field is a newly added field or an original field in the first information.

In a possible manner, when the first field is an original field in the first information, the first field is a frequency domain resource allocation field in the first information.

In another possible manner, when the first field is a newly added field in the first information, the first information is in a downlink control information format DCI format 2-2.

In FIG. 18, the energy saving state information includes:
information that indicates the terminal device to go to sleep; or
information that indicates the terminal device to wake up.

In FIG. 18, optionally, all or some bits of the second field are used to indicate the information about the time length in which the terminal device maintains the energy saving state.

Optionally, all or some values of the second field are used to indicate the information about the time length in which the terminal device maintains the energy saving state.

Optionally, the second field is a newly added field or an original field in the first information.

In a possible manner, when the second field is an original field in the first information, the second field is a frequency domain resource allocation field in the first information.

In another possible manner, when the second field is a newly added field in the first information, the first information is in the downlink control information format 2-2.

In FIG. 18, optionally, the time length information is:
one or more slots; or
one or more subframes; or
one or more pieces of on duration on duration; or
one or more physical downlink control channel monitoring occasions PDCCH monitoring occasion.

In FIG. 18, the first information further includes at least one of the following fields:
a bandwidth part indicator field, a sounding reference signal request (SRS request) field, a transmit power control command for a preset physical uplink shared channel (TPC command for scheduled PUSCH) field, and an antenna port(s) field.

In FIG. 18, the transceiver module 182 is further configured to:
receive offset duration offset information sent by the terminal device, where the offset information indicates information about a time length between a receiving moment at which the terminal device receives the first information and a preset moment, and the preset moment is the first slot or the first subframe in which the terminal device enters on duration on duration in a discontinuous reception state.

In FIG. 18, the transceiver module 182 is further configured to:
receive capability information sent by the terminal device, where the capability information is used to indicate whether the terminal device has an energy saving working mode.

In FIG. 18, the transceiver module 182 is further configured to:
send second information to the terminal device, where the second information is used to indicate whether the terminal device switches to the energy saving working mode.

Optionally, the second information is at least one of a radio resource control Radio Resource Control message, a media access control control element (MAC CE) message, and downlink control information (DCI).

In FIG. 18, the transceiver module 182 is further configured to:
send third information to the terminal device, where the third information is used to indicate that the terminal device is in a sleep state or a wake-up state.

Optionally, the third information is at least one of a radio resource control (RRC) message, a media access control control element (MAC CE) message, and downlink control information (DCI).

Optionally, the first information is downlink control information (DCI).

The communications device in the embodiment shown in FIG. 18 may be configured to execute the technical solution on a network device side in the foregoing method embodiment. For an implementation principle and a technical effect of the communications device, further refer to related descriptions in the method embodiment. Optionally, the communications device may be a base station, or may be a component (for example, a chip or a circuit) of a base station.

Figure 19:
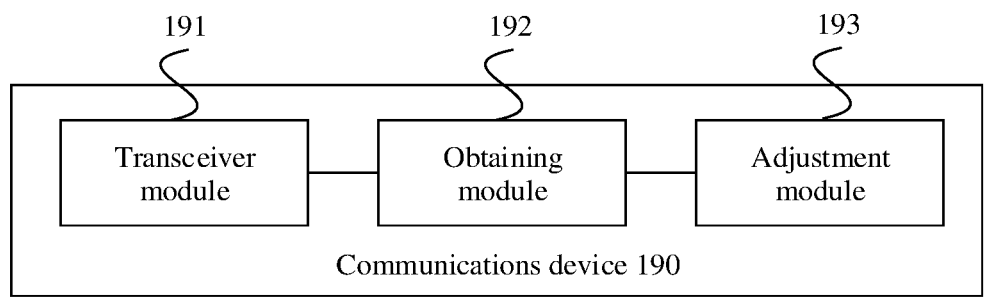
FIG. 19 is a function block diagram of another communications device according to an embodiment of this application.

FIG. 19 is a schematic structural diagram of another communications device according to an embodiment of this application. As shown in FIG. 19, the communications device 190 includes a transceiver module 191, an obtaining module 192, and an adjustment module 193. The transceiver module 191 is configured to receive first information sent by a network device, the first field includes information indicating an energy saving state of a terminal device, and the second field includes information indicating a time length in which the terminal device maintains the energy saving state. The obtaining module 192 is configured to obtain at least one of the energy saving state information and the time length information based on the first information. The adjustment module 193 is configured to adjust the energy saving state of the terminal device based on the at least one of the energy saving state information and the time length information.

In FIG. 19, optionally, all or some bits of the first field are used to indicate the energy saving state information of the terminal device.

Optionally, all or some values of the first field are used to indicate the energy saving state information of the terminal device.

Optionally, the first field is a newly added field or an original field in the first information.

In a possible manner, when the first field is an original field in the first information, the first field is a frequency domain resource allocation field in the first information.

In another possible manner, when the first field is a newly added field in the first information, the first information is in a downlink control information format DCI format 2-2.

In FIG. 19, optionally, the energy saving state information includes:
information that indicates the terminal device to go to sleep; or
information that indicates the terminal device to wake up.

In FIG. 19, optionally, all or some bits of the second field are used to indicate the information about the time length in which the terminal device maintains the energy saving state.

Optionally, all or some values of the second field are used to indicate the information about the time length in which the terminal device maintains the energy saving state.

Optionally, the second field is a newly added field or an original field in the first information.

In a possible manner, when the second field is an original field in the first information, the second field is a frequency domain resource allocation field in the first information.

In another possible manner, when the second field is a newly added field in the first information, the first information is in the downlink control information format 2-2.

In FIG. 19, optionally, the time length information is:
one or more slots; or
one or more subframes; or
one or more pieces of on duration on duration; or
one or more physical downlink control channel (PDCCH) monitoring occasions.

In FIG. 19, optionally, the first information further includes at least one of the following fields:
a bandwidth part indicator field, a sounding reference signal request (SRS request) field, a transmit power control command for a preset physical uplink shared channel (TPC command for scheduled PUSCH) field, and an antenna port(s) field.

In FIG. 19, the transceiver module 191 is further configured to:
send offset duration offset information to the network device, where the offset information indicates information about a time length between a receiving moment at which the terminal device receives the first information and a preset moment, and the preset moment is the first slot or the first subframe in which the terminal device enters on duration on duration in a discontinuous reception state.

In FIG. 19, the transceiver module 191 is further configured to:
send capability information to the network device, where the capability information is used to indicate whether the terminal device has an energy saving working mode.

In FIG. 19, the transceiver module 191 is further configured to receive second information sent by the network device, where the second information is used to indicate whether the terminal device switches to the energy saving working mode.

Optionally, the second information is at least one of a radio resource control (RRC) message, a media access control control element (MAC CE) message, and downlink control information (DCI).

In FIG. 19, the transceiver module 191 is further configured to receive third information sent by the network device, where the third information is used to indicate that the terminal device is in a sleep state or a wake-up state.

Optionally, the third information is at least one of a radio resource control (RRC) message, a media access control control element (MAC CE) message, and downlink control information (DCI).

Optionally, the first information is downlink control information (DCI).

In FIG. 19, when the first information includes the first field and the first field is the information that indicates the terminal device to go to sleep, the obtaining module 192 is further configured to abandon reading other information in the first information.

The communications device in the embodiment shown in FIG. 19 may be configured to execute the technical solution in the foregoing method embodiment. An implementation principle and a technical effect of the communications device are similar to those of the method embodiment. The communications device may be a terminal device, or may be a component (for example, a chip or a circuit) of a terminal device.

It should be understood that division of the modules in the communications devices in FIG. 18 and FIG. 19 is merely logical function division. During actual implementation, all or some of the units may be integrated into one physical entity, or the units may be physically separated. In addition, all of the modules may be implemented in a form of software invoked by a processing element or in a form of hardware. Alternatively, some of the modules may be implemented in a form of software invoked by a processing element, and some of the modules may be implemented in a form of hardware. For example, the transceiver module may be an independently disposed processing element, or may be integrated into a communications device, for example, a specific chip of the terminal device for implementation. In addition, the transceiver module may be stored in a memory of the communications device in a form of a program, and a specific processing element of the communications device invokes and performs a function of each of the foregoing modules. Implementations of other modules are similar. In addition, all or some of the modules may be integrated, or may be implemented independently. The processing element described herein may be an integrated circuit and has a signal processing capability. In an implementation process, steps in the foregoing methods or the foregoing modules can be implemented by using a hardware integrated logical circuit in the processing element, or by using an instruction in a form of software.

For example, the foregoing modules may be configured as one or more integrated circuits for implementing the foregoing methods, for example, one or more application-specific integrated circuits (ASIC), one or more microprocessors (DSP), or one or more field programmable gate arrays (FPGA). For another example, when a module is implemented in a form of a program invoked by a processing element, the processing element may be a general-purpose processor, for example, a central processing unit (CPU) or another processor that can invoke the program. For still another example, the modules may be integrated together, and implemented in a form of a system-on-a-chip (SOC).

An embodiment of this application further provides a computer-readable storage medium. The computer-readable storage medium stores a computer program. When the computer program is run on a computer, the computer is enabled to perform the information sending method and/or the information receiving method in the foregoing embodiments.

In addition, an embodiment of this application further provides a computer program product. The computer program product includes a computer program. When the computer program is run on a computer, the computer is enabled to perform the information sending method and/or the information receiving method in the foregoing embodiments.

This application further provides a chip, including a memory and a processor. The memory is coupled to the processor.

The processor is configured to perform the information sending method and/or the information receiving method described in the foregoing embodiments. Implementations of the information sending method and the information receiving method performed by the chip are described in the foregoing embodiments.

Optionally, the chip may be an independently disposed chip, or may be a chip shared by a plurality of different processors. This is not particularly limited in this embodiment of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to this application are completely or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

What is claimed is:

1. An information sending method, comprising:
   configuring, by a network device, first information, wherein
   the first information comprises:
   a first field, and
   a second field, wherein
   the first field includes information indicating an energy saving state of a terminal device and the information included in the first field enables the terminal device to adjust the energy saving state to a wake-up state or a sleep state, and
   the second field includes information indicating a time length in which the terminal device maintains the energy saving state; and
   sending, by the network device, the first information to the terminal device, wherein
   the first information is in downlink control information format 2-2,
   content of the second field is determined based on a time period in which the network device sends data to the terminal device, and
   the content of the second field is determined based on the time period in which the network device stops sending data to the terminal device.

2. The method according to claim 1, wherein
   the first field is a frequency domain resource allocation field in the first information.

3. The method according to claim 1, wherein
   the second field is a frequency domain resource allocation field in the first information.

4. The method according to claim 1, wherein the time length information includes:
   one or more slots;
   one or more subframes;
   one or more pieces of on duration; or
   one or more physical downlink control channel (PDCCH) monitoring occasions.

5. The method according to claim 1, wherein the first information further comprises at least:
   a bandwidth part indicator field, a sounding reference signal request field, a transmit power control command for a preset physical uplink shared channel field, and an antenna port(s) field.

6. The method according to claim 1, further comprising:
   receiving, by the network device, offset duration offset information sent by the terminal device, wherein the offset duration offset information indicates information about a time length between a receiving moment at which the terminal device receives the first information and a preset moment, and the preset moment is the first slot or the first subframe in which the terminal device enters on duration in a discontinuous reception state.

7. The method according to claim 1, further comprising:
   receiving, by the network device, capability information sent by the terminal device, wherein the capability information is used to indicate whether the terminal device has an energy saving working mode.

8. The method according to claim 1, further comprising:
   sending, by the network device, second information to the terminal device, wherein the second information is used to indicate whether the terminal device switches to an energy saving working mode.

9. The method according to claim 1, further comprising:
sending, by the network device, third information to the terminal device, wherein the third information is associated with the terminal device being in the sleep state or the wake-up state.

10. The method according to claim 9, wherein the third information includes at least one of a radio resource control (RRC) message, a media access control control element (MAC CE) message, and downlink control information (DCI).

11. The method according to claim 1, wherein the first information is downlink control information (DCI).

12. The method according to claim 1,
wherein all or some values of the first field are used to indicate the energy saving state information of the terminal device; or
wherein all or some bits of the second field are used to indicate the information about the time length in which the terminal device maintains the energy saving state.

13. The method according to claim 1, wherein all or some values of the second field are used to indicate the information about the time length in which the terminal device maintains the energy saving state.

14. An information receiving method, comprising:
receiving, by a terminal device, first information sent by a network device, wherein
the first information comprises:
a first field, and
a second field, wherein
the first field includes information indicating an energy saving state of the terminal device,
the second field includes information indicating a time length in which the terminal device maintains the energy saving state,
content of the second field is determined based on a time period in which the network device sends data to the terminal device, and
the content of the second field is determined based on the time period in which the network device stops sending data to the terminal device;
obtaining, by the terminal device, at least one of the energy saving state information and the time length information based on the first information; and
adjusting, by the terminal device, the energy saving state of the terminal device, to a wake-up state or a sleep state, based on the at least one of the energy saving state information and the time length information.

15. The method according to claim 14, wherein the first field includes:
a frequency domain resource allocation field in the first information; or
a downlink control information format (DCI) format 2-2.

16. The method according to claim 14, wherein the second field includes:
a frequency domain resource allocation field in the first information; or
the first information is in a downlink control information (DCI) format 2-2.

17. A non-transitory computer-readable storage medium configured to store computer readable instructions that, when executed by a processor, cause the processor to provide execution comprising:
configuring first information, wherein
the first information comprises:
a first field, and
a second field, wherein
the first field includes information indicating an energy saving state of a terminal device and the information included in the first field enables the terminal device to adjust the energy saving state to a wake-up state or a sleep state,
the second field includes information indicating a time length in which the terminal device maintains the energy saving state,
content of the second field is determined based on a time period in which a network device sends data to the terminal device, and
the content of the second field is determined based on the time period in which the network device stops sending data to the terminal device; and
sending the first information to the terminal device.

18. The non-transitory computer-readable storage medium according to claim 17, wherein
the first information is in a downlink control information format (DCI) format 2-2.

* * * * *